United States Patent
Mukherjee et al.

(10) Patent No.: US 11,212,103 B1
(45) Date of Patent: Dec. 28, 2021

(54) CONTINUOUS SPACE-BOUNDED NON-MALLEABLE CODES FROM STRONGER PROOFS-OF-SPACE

(71) Applicant: Visa International Service Association, San Francisco, CA (US)

(72) Inventors: Pratyay Mukherjee, Sunnyvale, CA (US); Binyi Chen, Goleta, CA (US); Yilei Chen, Palo Alto, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 17/282,360

(22) PCT Filed: Aug. 7, 2019

(86) PCT No.: PCT/US2019/045562
§ 371 (c)(1),
(2) Date: Apr. 1, 2021

(87) PCT Pub. No.: WO2020/072129
PCT Pub. Date: Apr. 9, 2020

Related U.S. Application Data

(60) Provisional application No. 62/740,301, filed on Oct. 2, 2018, provisional application No. 62/851,565, filed on May 22, 2019.

(51) Int. Cl.
*H04L 9/32* (2006.01)
*G06F 21/60* (2013.01)
(Continued)

(52) U.S. Cl.
CPC ........ *H04L 9/3218* (2013.01); *G06F 16/9024* (2019.01); *G06F 21/602* (2013.01); *H04L 9/085* (2013.01)

(58) Field of Classification Search
CPC ... H04L 9/3218; H04L 9/085; G06F 16/9024; G06F 21/602
See application file for complete search history.

(56) References Cited

U.S. PATENT DOCUMENTS 9,167,207 B1 10/2015 Drewry et al.
10,984,139 B2 4/2021 Mukherjee et al.
(Continued)

FOREIGN PATENT DOCUMENTS

JP 2016126228 7/2016

OTHER PUBLICATIONS

Faust, Sebastian et al. "Non-Malleable Codes for Space-Bounded Tampering" [online] IACR, Jun. 2017 [retrieved Aug. 10, 2021]. Retrieved from the Internet: URL: https://eprint.iacr.org/2017/530.pdf (Year: 2017).*

(Continued)

*Primary Examiner* — Taghi T Arani
*Assistant Examiner* — Joshua Raymond White
(74) *Attorney, Agent, or Firm* — Kilpatrick Townsend & Stockton LLP

(57) ABSTRACT

Systems, methods, and apparatuses for protecting a secret on a device with limited memory, while still providing tamper resistance, are described. To achieve security, an encoding computer can apply a memory-hard function MHF to a secret S and determine a result Y, then determine a proof $\pi$ for the result Y. Then, the encoding computer can send a codeword C comprising the secret S and the proof $\pi$ to a decoding computer. The decoding computer can retrieve the codeword C from persistent memory and parse the secret S and the proof $\pi$. The decoding device can use transient memory decode the codeword C by verifying the proof $\pi$ was generated with the secret S and the result Y. When the correctness of the result Y is verified, the decoding device (Continued)

can apply a cryptographic function to input data using the secret S then reset the transient memory.

20 Claims, 14 Drawing Sheets

(51) Int. Cl.
*H04L 9/08* (2006.01)
*G06F 16/901* (2019.01)

(56) References Cited

U.S. PATENT DOCUMENTS

| | | |
|---|---|---|
| 2005/0114683 A1 | 5/2005 | Jin et al. |
| 2005/0169478 A1 | 8/2005 | Cramer et al. |
| 2012/0072225 A1 | 3/2012 | Richardson et al. |
| 2012/0324231 A1 | 12/2012 | Camenisch et al. |
| 2015/0327072 A1 | 11/2015 | Powell et al. |
| 2017/0249460 A1 | 8/2017 | Lipton et al. |
| 2018/0067874 A1 | 3/2018 | Connolly et al. |
| 2018/0198632 A1 | 7/2018 | Gajek et al. |

OTHER PUBLICATIONS

Faonio, Antonio et al. "Continously Non-Malleable Codes with Split-State Refresh" [online] IACR, Jun. 2018 [retrieved Aug. 10, 2021]. Retrieved from the Internet: URL: https://eprint.iacr.org/2018/606.pdf (Year: 2018).*

Agarwal, Divesh et al. "Continous Non-Malleable Codes in the 8-Split-State Model" [online] IACR, Apr. 2018 [retrieved Aug. 10, 2021]. Retrieved from the Internet: URL: https://eprint.iacr.org/2017/357.pdf (Year: 2018).*

Mishra, Sweta "Design and Analysis of Password-based Authentication Systems" [online] IIIT-Delhi, Oct. 2017 [retrieved Aug. 10, 2021]. Retrieved from the Internet: URL: https://repository.iiitd.edu.in/xmlui/bitstream/handle/123456789/598/PhD1209.pdf?sequence=1&isAllowed=y (Year: 2017).*

Faust et al., "Non-Malleable Codes for Space-Bounded Tampering", International Association for Cryptologic Research, XP061023577, Jun. 6, 2017, pp. 95-126.

Faonio et al., "Continuously Non-malleable Codes with Split-State Refresh", 16th International Conference on Applied Cryptography and Network Security—ACNS, Jun. 15, 2018, 52 pages.

Application No. PCT/US2019/045562, International Search Report and Written Opinion, dated Nov. 22, 2019, 9 pages.

European Application No. 19868385.6, European Extended Search Report dated Oct. 21, 2021, 9 pages.

Sebastian Faust et al.: "Non-Malleable Codes For Space-Bounded Tampering", IACR, International Association For Cryptologic Research, vol. 20170607:035302, Jun. 6, 2017 (Jun. 6, 2017), pp. 95-126 (32 pages), XP061023577.

Ling Ren et al.: "Proof of Space from Stacked Expanders", IACR, International Association For Cryptologic Research, vol. 20160521:182051, May 21, 2016 (May 21, 2016), pp. 262-285 (24 page), XP061020959.

* cited by examiner

PExt-NIPoS Construction

810 $\text{Setup}^{\mathcal{H}}(1^\lambda)$: On input the security parameter $1^\lambda$ output a set of public parameters $pp_{pos} \in \{0,1\}^*$, which consist of values $\tau, \tau_c, N_c, N \in \mathbb{N}$, the DAG $G$ as described above.

820 $P^{\mathcal{H}}_{pp_{pos}}(id)$: Given public parameters $pp_{pos} \in \{0,1\}^*$ and identity $id \in \{0,1\}^{k_{pos}}$, do as follows:

821    1. For every node $v \in V$, compute a $\mathcal{H}_{id}$-labeling of $v$ as $\text{label}(v) := \mathcal{H}_{id}(v, \text{label}(\text{pred}(v)))$, where $\text{label}(\text{pred}(v))$ are the $\mathcal{H}_{id}$-labelings of $v$'s parents in $G$. Let $\ell := (\text{label}(v))_{v \in V} \in \{0,1\}^{N \cdot n_\mathcal{H}}$ be the $\mathcal{H}_{id}$-labeling of the graph $G$.

822    2. Given labeling $\ell$ compute the Merkle commitment $\phi_\ell := \text{MCom}^{\mathcal{H}_{com}}(\ell)$, where $\phi_\ell \in \{0,1\}^{n_\mathcal{H}}$ is the Merkle root.

823    3. Determine the set of challenges $(\text{check}, \text{chal}) := \mathcal{H}_{chal}(id, \phi_\ell)$.

824    4. Output the proof-of-space $\pi$ which consists of two parts:
- The Merkle-root value and the two challenge sets
$$(\phi_\ell, \text{check}, \text{chal}) \in \{0,1\}^{n_\mathcal{H}} \times V^\tau \times V_c^{(1)} \times \cdots \times V_c^{(\tau_c)}.$$
- Let $\text{pred}(\text{check})$ be the set of predecessors for nodes in check. For every node $v \in \text{check} \cup \text{pred}(\text{check}) \cup \text{chal}$, output the Merkle-tree opening path from the $v$-th leaf (with label $\text{label}(v)$) to the Merkle-root (with value $\phi_\ell$): $\text{MOpen}^{\mathcal{H}_{com}}(\ell, v)$.

830 $V^{\mathcal{H}}_{pp_{pos}}(id, \pi)$: Given public parameters $pp_{pos}$, identity $id \in \{0,1\}^{k_{pos}}$ and a *candidate* proof-of-space $\pi \in \{0,1\}^{n_{pos}}$, check the correctness of $\pi$ with respect to $id$ as follows:

831    1. Parse
$$\left[ (\phi_\ell, \text{check}, \text{chal}), \left\{ (z_v, (y_v^{(1)}, \ldots, y_v^{(\log N)})) \right\}_{v \in \text{check} \cup \text{pred}(\text{check}) \cup \text{chal}} \right] := \pi$$

832    2. Check $(\text{check}, \text{chal}) = \mathcal{H}_{chal}(id, \phi_\ell)$.

833    3. For every node $v \in \text{check}$, denote by $z_v$ the opening for $v$, and $z_{\text{pred}(v)}$ the openings for $v$'s parents in graph $G$. The check: $z_v = \mathcal{H}_{id}(v, z_{\text{pred}(v)})$.

834    4. For every node $v \in \text{check} \cup \text{pred}(\text{check}) \cup \text{chal}$, denote by $(z_v, (y_v^{(1)}, \ldots, y_v^{(\log N)}))$ the opening path for $v$, $V$ checks that
$$\text{MVer}^{\mathcal{H}_{com}}(v, \phi_\ell, z_v, (y_v^{(1)}, \ldots, y_v^{(\log N)})) = 1.$$

835    5. Output 1 if and only if all of the above check passes; otherwise output 0.

FIG. 8

CONTINUOUS SPACE-BOUNDED NON-MALLEABLE CODES FROM STRONGER PROOFS-OF-SPACE

CROSS-REFERENCES TO RELATED APPLICATIONS

This application is a 371 application of International Application No. PCT/US2019/045562, filed Aug. 7, 2019 which is a non-provisional application of and claims the benefit of the filing date of U.S. Provisional Application No. 62/740,301, filed on Oct. 2, 2018, and U.S. Provisional Application No. 62/851,565, filed on May 22, 2019, which are herein incorporated by reference in their entirety.

BACKGROUND

When secret data (such as secret key for encryption) is stored in secure" memory of the devices, attackers can still tamper with the "secure" memory using fault attacks. In fault attacks, values in a memory cell are altered, and an output of a secure function (e.g., in a secure element including the secure memory) that uses the secret data can be used to deduce the original secret data. Once the secret data is known to the attacker, she can use that to break the security of the relevant system, for example, by decrypting the ciphertexts encrypted with secret key(s), which are part of the recovered secret data. As other examples, an attacker could use the secret data in some authentication protocol to gain improper access to a resource. Such authentication could involve a digital signature using the improperly obtained secret data. Such an attack might occur when a phone is stolen or malware has been introduced.

The overall effectiveness of fault attacks as a method of hardware tampering and memory leakage makes them a widely-used technique for accessing private data stored on consumer devices. For example, fault attacks can be effective against RSA or elliptic curve Diffie-Helman techniques, as may be used in transport layer security (TLS). As such, a growing number of researchers are attempting to find coding schemes that protect data against the vulnerabilities of memory to fault attacks and similar forms of hardware tampering.

Such attacks can be partially addressed by using non-malleable codes, such that the secret data is stored by encoding with a non-malleable code. Such encoding does not need a key, and is thus different from encryption. Use of a non-malleable code can allow the secure element to detect whether tampering has been done, or result in a same output. However, non-malleable codes require a decoding function to be used in the secure element. It is possible that attacker malware can include or gain access to the decoding function, as well as include an encoding function. Such malware can recover the secret data using tampering. Existing protection techniques do not address such malware, and thus leave open vulnerabilities.

Embodiments described herein address these and other problems, individually and collectively.

BRIEF SUMMARY

Embodiments of the disclosure include systems, methods, and apparatuses for protecting a secret on a device with limited memory, while still providing tamper resistance. In particular, embodiments can protect the secret from continuous space-bounded tampering, in which tampering is done repeatedly by a small attacker that has limited available computational space and memory. To achieve security, an encoding computer can apply a memory-hard function MHF to a secret S that is to be protected and determine a result Y. The encoding computer may then determine a proof $\pi$ for the result Y, to later prove that the result Y was computed with the secret S. The proof $\pi$ may be a non-interactive proof of space, with an additional property of proof-extractability. Applying the memory-hard function and determining the proof $\pi$ may take a large amount of space (e.g., on the order of gigabytes or terabytes). Then, the encoding computer can send a codeword C comprising the secret S and the proof $\pi$ to a decoding computer. The decoding computer can then store the codeword C in persistent memory.

When the decoding computer wants to use the secret S, for example, to apply a cryptographic function to the secret S, the decoding computer can retrieve the codeword C and parse the secret S and the proof $\pi$. The decoding device can use transient memory to decode the codeword C by verifying the proof $\pi$ was generated with the secret S and the result Y. The decoding may be performed with a small amount of memory, much less than the encoding. When the correctness of the result Y is verified, the decoding device can apply a cryptographic function to input data using the secret S (e.g., digitally signing a message). If the correctness of the result Y is not verified, this can indicate to the decoding computer that the codeword C has been tampered. The decoding computer can then self-destruct to prevent further tampering attempts. After decoding the codeword C, the decoding computer can reset the transient memory to clear information about the secret S. A small amount of data may be persisted in an extra-persistent space in the persistent memory.

According to one embodiment, a method decodes a secret on a decoding computer. A codeword C can be stored in a persistent memory of the decoding computer. The codeword C comprises a proof value $\pi$ and a secret S, and uses c bytes of memory. The persistent memory comprises P bytes of memory. The proof value $\pi$ is determined using the secret S and a result Y, the result Y obtained by applying a memory-hard function MHF to the secret S or to a function of the secret S. Applying the memory-hard function MHF to the secret S requires at least N bytes of memory. More than one proof value may be combinable with secret S to provide a valid codeword. P-c memory of the decoding computer forms an extra-persistent space. The method then includes receiving input data, retrieving the codeword C from the persistent memory, and parsing the codeword C to identify the proof value $\pi$ and the secret S. A decoding of the codeword C can be performed, using a transient memory of the decoding computer. The decoding of the codeword C can be done by using the proof value $\pi$ to verify a correctness of the result Y as being obtained from memory-hard function MHF using the secret S. The decoding function is operable to use K bytes of memory, and K is less than N. When the correctness is true, a cryptographic function is applied to the input data using the secret S to obtain output data. When the correctness is false, an error message is provided and the decoding computer is made inoperable to perform subsequent decoding operations. Then the transient memory of the decoding computer is refreshed. E bytes of memory of the decoding are persisted on the extra-persistent space. E is less than N and less than the size of the result Y.

These and other embodiments of the invention are described in detail below. For example, other embodiments are directed to systems, devices, and computer-readable media associated with methods described herein.

Further details regarding embodiments of the invention can be found in the Detailed Description and the Figures described herein.

BRIEF DESCRIPTION OF THE DRAWINGS

FIG. 8 shows an example construction of a proof of space according to embodiments.

TERMS

Figure 1:
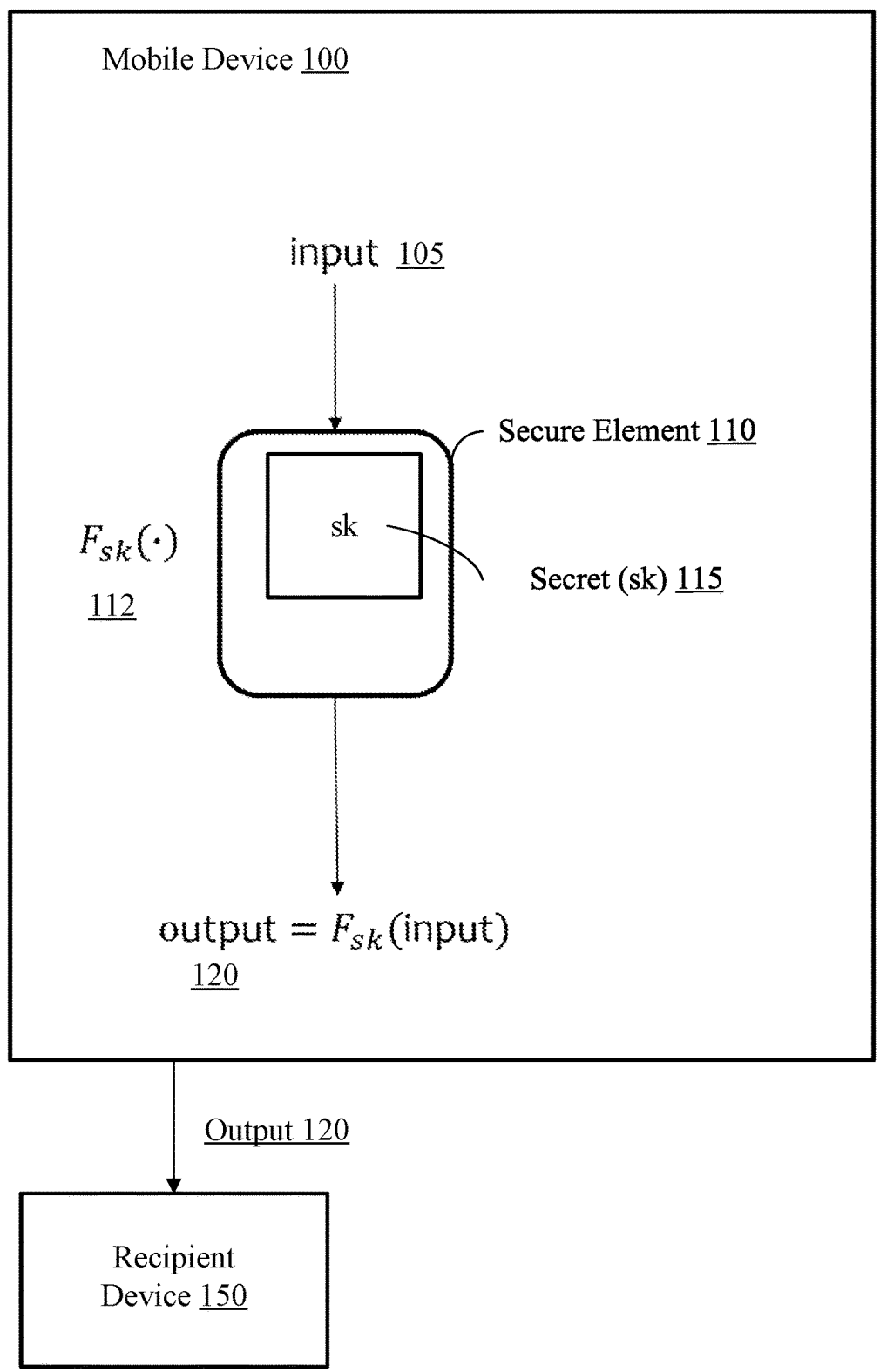
FIG. 1 shows a mobile device storing a secret sk in a secure element.

"Non-malleable code(s)" may refer to a coding scheme for which decoding a codeword that has been altered (e.g. by a tampering adversary) results in either the original (unaltered) message or a completely unrelated value from which no knowledge can be inferred.

"Space-bounded," "memory-bounded," or "memory-hard function" (MHF) may describe a function or task where the time needed to complete the task is mainly determined by the amount of usable memory required. For example, for a space-bounded computational problem, the efficiency of the particular computational process may be most affected by the rate at which data can be read and stored into memory (i.e. memory bandwidth) rather than by the clock speed of the processor. A memory hard function requires a certain number of storage bits to be performed. Strict memory hard hashing functions are an example of a memory-hard function. A memory-hard function needs time T and space S for ordinary computation, but the amount of time increases greatly if the amount of available space is less than S.

"Verifiable computation" may refer to a procedure to efficiently check correctness of a computation without performing the computation itself. A goal can be to develop a verification procedure that is much more resource (space/time)-efficient than the target computation itself. For example, one may consider a memory-intensive computation on a huge database over a cloud-server. A client wants the server to perform some computation (e.g. aggregation) on the database and can use verifiable computation to check whether the result is correct without performing the actual operation on the data.

A "proof function" may refer to a function that produces a "proof value" that can be used to verify a computation. The proof value may be succinct in that it can be computed with relatively low memory (space), thereby allowing the decoding to be produced in low space. The use of a MHF during encoding can ensure that high memory is required, even when the proof function itself can be performed in low memory.

A "verification function" may refer to a procedure for using a proof value to confirm that a code C is generated from a secret S by a specified encoding function.

A "security parameter" may refer to a fundamental system parameter that is specified according to the desired security level. All other metrics (for example, running time, memory required etc.) of a scheme may be measured in terms of the security parameter.

A "randomized algorithm" may refer to a computation that uses random bits extracted from a trusted source of randomness. The output of such an algorithm, on a particular input, can follow a probability distribution.

A "deterministic algorithm" may refer to a computation that does not use any randomness, and the output of such algorithm, on a particular input, is fixed as it is determined only by the input.

A "secure element" is a tamper-resistant platform (e.g., a one chip secure microcontroller) capable of securely hosting applications and their confidential and cryptographic data (e.g. key management) in accordance with the rules and security requirements set forth by a set of well-identified trusted authorities. Example form factors include Universal Integrated Circuit Card (UICC), embedded SE and microSD.

DETAILED DESCRIPTION

Sensitive data, such as secret keys, that is stored on a secure element of a device is still vulnerable to tampering. In particular, an attacker can modify the secret key on the secure element, such that when the secret key is used later it reveals information to the attacker. For example, a user can encrypt a message using the tampered secret key, where the encrypted output can be used to determine information about the original secret key.

Some attacks can be prevented by using space-bounded non-malleable codes to protect secret data. The secret is encoded as a codeword with an encoding function that takes a large amount of space to compute, and thus must be done outside of the device. The codeword can be decoded on the device in a small amount of space (e.g., orders of magnitude smaller than the encoding space). However, such solutions are only secure for a limited number of tampering attacks. The leakage is proportional to the number of attacks, so over time the entire secret can be discovered. An attacker could generate all possible combinations for a known decoder, and thus can determine which secret was used after sufficient leakage.

Some embodiments can protect data against tampering attacks, by using non-malleable codes, where the leakage is proportional to the logarithm of the number of tampering attacks. Thus, even with a large number of attacks, a small amount of information is leaked. To do so, a secret can be encoded with a non-interactive proof of space (NIPoS) that is proof-extractable. There may not be a one-to-one correspondence between secret and proof, so it is more difficult to completely explore the space of secret-proof pairs, since the possible combination is much larger, while still only having a relatively few proofs per secret that will actually work. Otherwise, an attacker could use an external device to determine all possible codewords, and then identify which one provides the same ciphertext output for a given input.

Such proofs can be constructed in a number of ways, including using graph labeling and challenge-hard graphs. As a result of using a proof-extractable NIPoS, an attacker that attempts to falsify a proof may need to compute numerous secret-proof pairs (codes) outside of the memory available for tampering (tampering space) on the device and use fault attacks to try possible codes before possibly gaining access to the secret. The number of secret-proof pairs that can be leaked is bounded by the available tampering space, and the description size of the tampering virus. Embodiments can also include a "self-destruct" mechanism. As an example, the "self-destruct" mechanism can cause the small-space device (e.g., a secure element) to erase its entire state (or make it non-functional) once a tampering is detected.

Some embodiments can preclude an attacker from partially computing the proof outside the device and then finishing computing the proof inside the device using a tampering virus that can access the secret S. For example, there can be some persistent space that stores the code (the secret S and the proof $7r$) and some transient space used in the decoding that is refreshed periodically (e.g., after every valid decoding). If tampering is detected by the decoder, then the secure element can become unusable. A small amount of the persistent space ("extra-persistent space") is not taken up by the code and thus could be used to retain some information about a previous secret and proof. For example, the persistent space could be used to store previous codes that had been verified. Then, an attacker could analyze the previous codes (secrets-proof pairs) that have been verified to determine a relationship so that new valid codes could be generated at will. Once a code is verified by a decoder, the secrets of the various codes could then be used to encrypt known input data, where the encrypted output can be used explore the codeword space. However, the extra-persistent space can be made much smaller than the result that the proof $\pi$ is derived from, thereby preventing sufficient leakage of information that could be used to determine the secret S.

Tampering of secure elements and non-malleable codes are first described below, followed by a description of NIPoS.

I. TAMPERING WITH SECURE ELEMENT

A mobile device may be provisioned with a secret sk for a variety of reasons. For example, the secret sk may be used as a secret key to encrypt communications. As another example, secret sk can be used for authentication purposes so that the mobile device can gain entry to a resource (e.g., a building, a computer, or an account). Depending on requirements, the mobile device can operate on input data (e.g., a challenge) using the secret sk to produce an authentication response when requested to an authentication computer.

A. Use of Secure Element to Encrypt

FIG. 1 shows a mobile device 100 storing a secret (sk) 115 in a secure element 110. Secure element 110 can store secret 115 in secure memory of secure element 110. Secure element 110 can also include circuitry to perform a function 112, identified as $F_{sk}(\cdot)$. Function 112 can operate on input 105 to provide output 120. Mobile device 100 can then send output 120 to a recipient device 150, which can decrypt output 120 to obtain input 105.

Such an operation may occur when input 105 is to be encrypted and sent as output 120, using secure 115 as an encryption key. Recipient device 150 could be previously provisioned with the same secret, potentially having initially provided the secret to mobile device 100. As another example, recipient device 150 can provide input 105 as a challenge to mobile device 100. Recipient device 150 can then compare output 120 to an expected result so as to authenticate mobile device 100.

B. Tampering to Determine Secret Key

Unfortunately, an attacker can compromise a secure element, e.g., using a tampering function as a fault attack. Thus, the attacker can be a tampering function that was installed onto the mobile device. The tampering function can further infiltrate the secure element so that secret data is manipulated, thereby resulting in output data that can reveal the contents of the secret data. Accordingly, in such situations, repeated outputs of the secure element after tampering can be analyzed to reveal the secret data.

Figure 2:
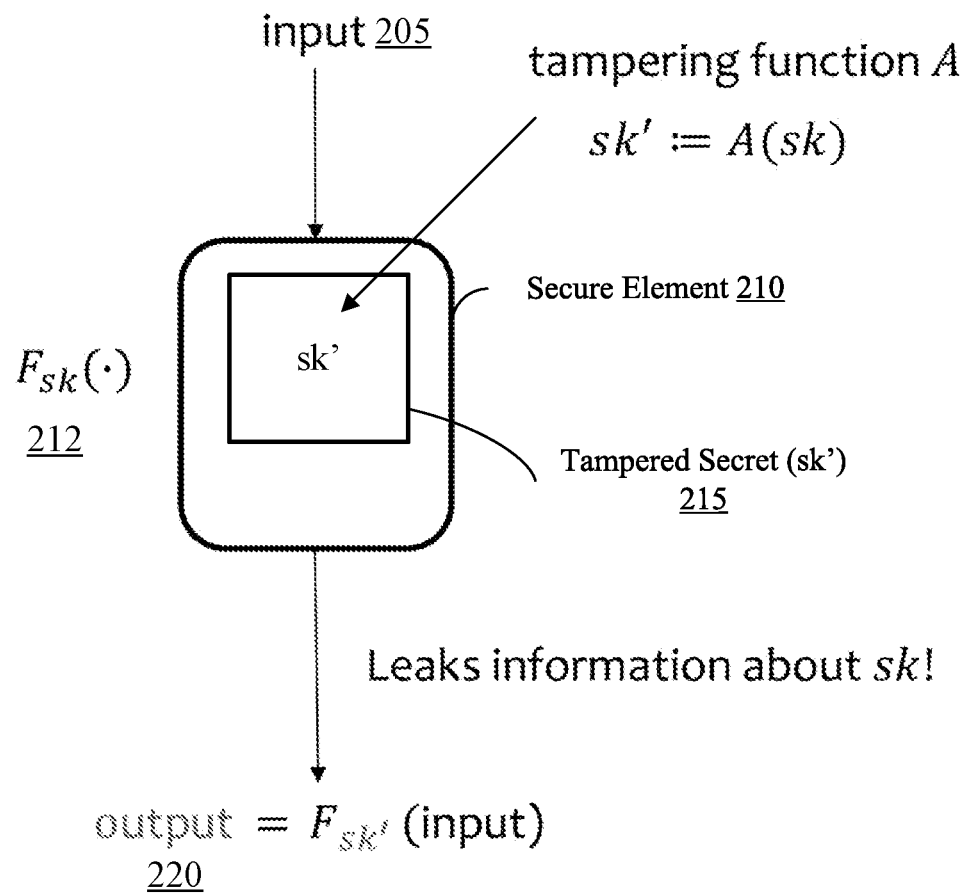
FIG. 2 shows a tampered secure element that may be inside a mobile device.

FIG. 2 shows a tampered secure element that may be inside a mobile device. Secure element 210 can perform a function 212 using a secret 215. As shown, secret 215 has been tampered, illustrated as sk' resulting from an original secret sk. The tampering function A can be defined by sk':=A(sk). As examples, the tampering function A can result from malware infecting secure element 210 or a physical tampering, as may be done with a laser on the physical memory.

For example, an attacker may introduce faults to memory (e.g., flash memory or dynamic random-access memory (DRAM)) by selectively altering charge states of its capacitors (e.g. using a laser), and thus performing "bit flips" that cause leakage of a targeted row of bits in a memory cell between read and write operations (i.e., Rowhammer attacks). These types of attacks are especially prevalent in smaller devices, which have memory units designed specifically for minimal power consumption, such as smartphones, tablets, and other mobile personal devices.

Output 220 is generated from input 205 using function 212 and the stored secret, which is a tampered secret 215 (shown as sk') in this example. Since output 220 depends on the value of the stored secret, modifying the stored secret will affect output 220. Accordingly, information about the original secret sk is leaked through output 220. The sufficient set of data points for different inputs and outputs after multiple rounds of tampering, an attacker could reconstruct the original secret sk from the inputs and outputs. It would be advantageous to prevent such attacks.

The attacker's goal is to recover the secret. If a mobile devices is stolen, someone can use it but someone cannot recover the secret key as it is stored in a secure element. However, once they have tampered with the device and then try to use it, they will get a different kind of response from the device.

Tampering can be performed by physical means, such as using a laser to alter the secret. Such tampering causes the memory to actually store different values and therefore operate in a slightly different manner. The slight change in response can be compared to the original response and used to make conclusions about the secret. If you cause some sort of change in the device when it sends out a cryptogram or sends out another type of data message, it can differ in such a way that one is able to probe what the secret is. For example, if the first bit of a secret is zero, it will respond differently than if the first bit of the secret is one.

In one particular context, a mobile device may store a mobile payment application, and may subsequently have a secret stored somewhere in the application. An attacker can then rely on non-physical tampering means, such as by introducing malware to the application, to tamper with the secret stored therein. For example, the malware may blindly alter values sent to a trusted execution environment or hardware module.

II. NON-MALLEABLE CODES AND THEIR APPLICATION

Non-malleable codes can provide some level of protection from tampering attacks. For example, a secret message m can be encoded to provide a code c, which is stored. Even if the code is tampered, a decode function may still provide the secret message m. Or, the decode function can provide an error indicating that tampering was performed. If neither of these happens, then the decoded message can be one that is unrelated to the message originally encoded.

Figure 3A:
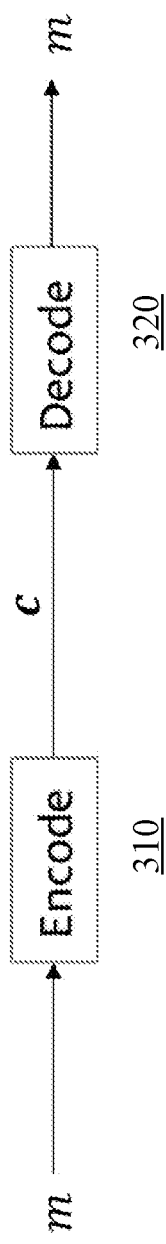
FIG. 3A shows the correctness property if the non-malleable codes.

FIG. 3A shows the correctness property of non-malleable codes. A secret message m is encoded by encoding function 310 to obtain code c. A decoding function 320 decodes the code c to obtain the original secret message m when there is no tampering present.

Figure 3B:
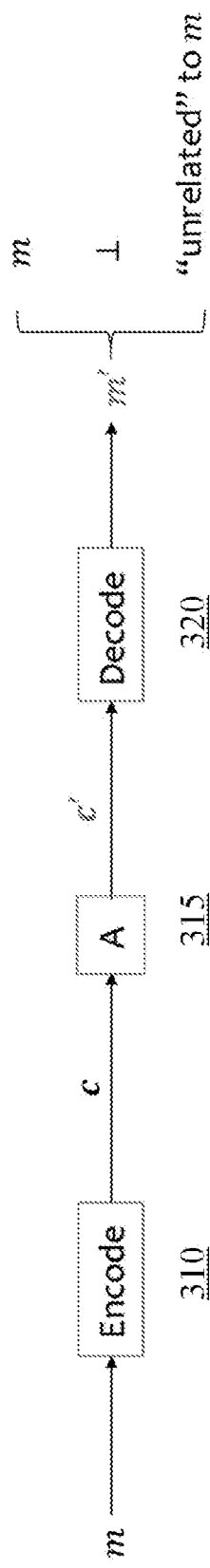
FIG. 3B shows the non-malleability property of non-malleable codes.

FIG. 3B shows the non-malleability property of non-malleable codes. Again, the secure message m is encoded by encoding function 310 to obtain code c. But this time, an attacker 315 changes the code c to be code c'. As a result, decoding function 320 decodes code c' to get m'. The decoding process may be such that both code c and code c' decode to m, and thus m' equals m. In theory, the decoding function 320 can also include a verification function that can detect when m does not equal m', i.e., a detection. The value 1 indicates an error. But, how to determine such a verification function is not clear, particularly if the decoding function 320 needs to be performed on a mobile device. The error detection does not need to be perfectly accurate, as long as m' is unrelated to m, and thus no information can be obtained from an output generated using m'.

Thus, for non-malleable codes, an encoded message will either completely change when altered or not change at all, or an error will be detected. An example for error-detection code using verification of computation is algebraic manipulation detection (AMD) code (www.iacr.org/archive/eurocrypt2008/49650468/49650468.pdf or tampering-detection code.

A. Protection of Secret Key

An implementation of non-malleable codes in the context of a secret stored on a mobile device (e.g., as in FIG. 1) is now described.

Figure 4:
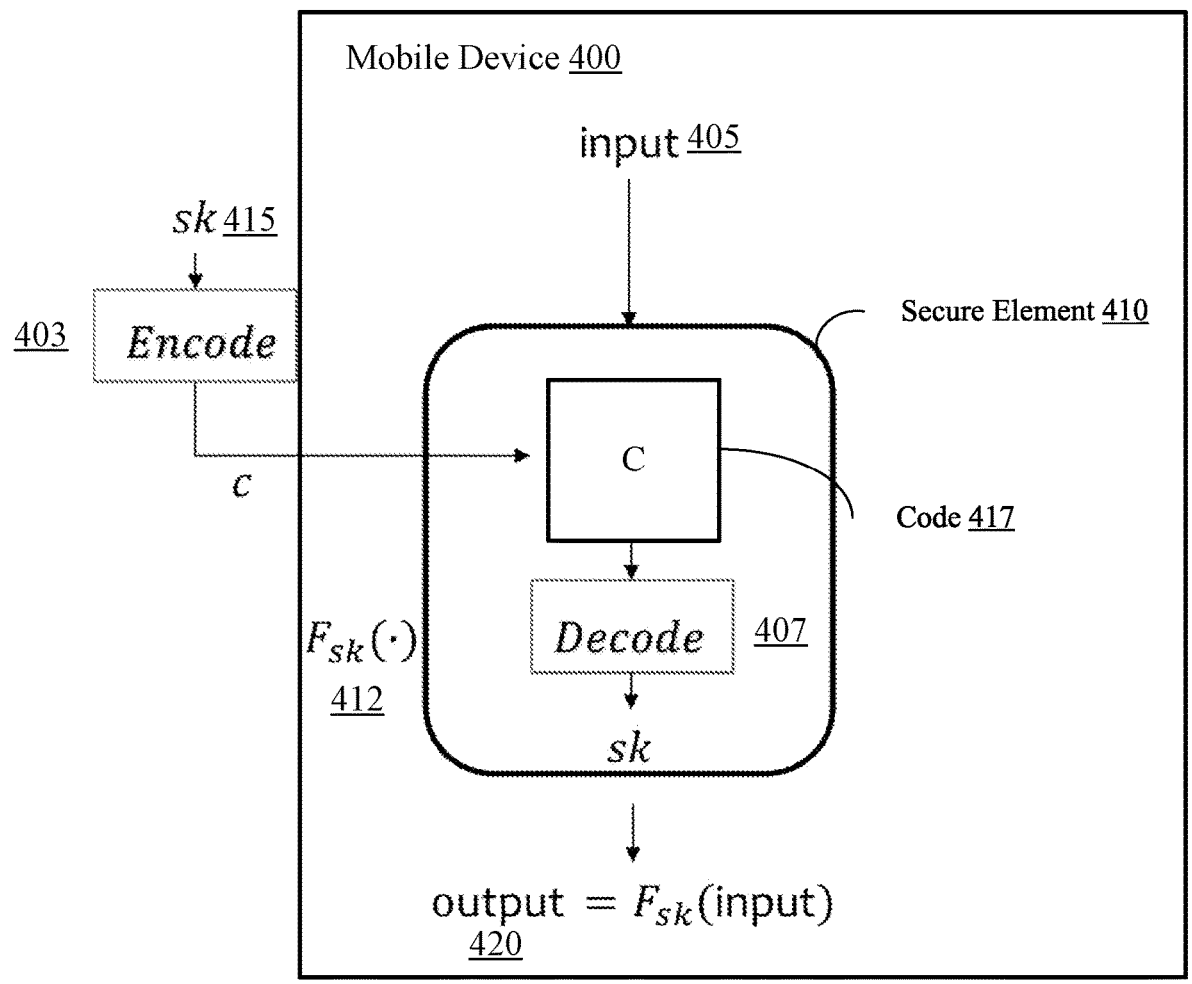
FIG. 4 shows a use of non-malleable codes for protecting a secret stored in a secure element of a mobile device according to embodiments.

FIG. 4 show a use of non-malleable codes for protecting a secret stored in a secure element of a mobile device 400. A secret (sk) 415 can be encoded by encoding function 403 to obtain a code c. Encoding function 403 can be implemented by a provisioning device outside of mobile device 400. Examples of a provisioning device include a server that provisions over a network or a local device, e.g., via a direct wired or wireless connection (e.g., Bluetooth or WiFi). In various implementations, the provisioning can be performed by a manufacturer, a service provider (e.g., a cellular carrier), or a technician after a user has acquired the mobile device.

Code c can be provided to mobile device 400 and stored in secure element 410. Secure element 410 can include circuitry (e.g., hardwired or programmable circuitry) for performing a function 412 (e.g., encryption) and for performing a decoding function 407.

As part of executing an application (e.g., a authentication or encrypted communication), a processor (not shown) of mobile device 400 can provide input 405 to secure element 410 to obtain an output 420, e.g., for sending to an external device. To generate output 420, decoding function 47 retrieves code 417 from a secure memory and decodes code 417 to obtain the original secret 415. Function 412 uses secret 415 to operate on input 405 to obtain output 420.

B. Tampering Resilience

A tampering class encompasses tampering functions/algorithms that a device can tolerate without exposing the underlying data. Typically, the encoding/decoding functions cannot tolerate all classes of tampering algorithms.

A popular tampering class is granular tampering. A secret can be encoded to get a codeword that has two parts, c1, c2. The two parts can be stored on a same device or two physically separate devices. The attack would have to be on the two different parts of codewords independently, with two different decoding functions that cannot see each other. The attacker knows there are two parts, but the tampering algorithms cannot contact each other because they are separated. The attacker may operate on one, but really needs both parts in order to expose information.

Another class is global tampering, which means that the attacker had access to the entire codeword. Such tampering classes assume that the attacked cannot decode or encode. In such a case, the attacker can only change the codeword a little bit and hope to decipher the original secret, which is very difficult. An example where the attacker cannot decode or encode is not provided.

Figure 5:
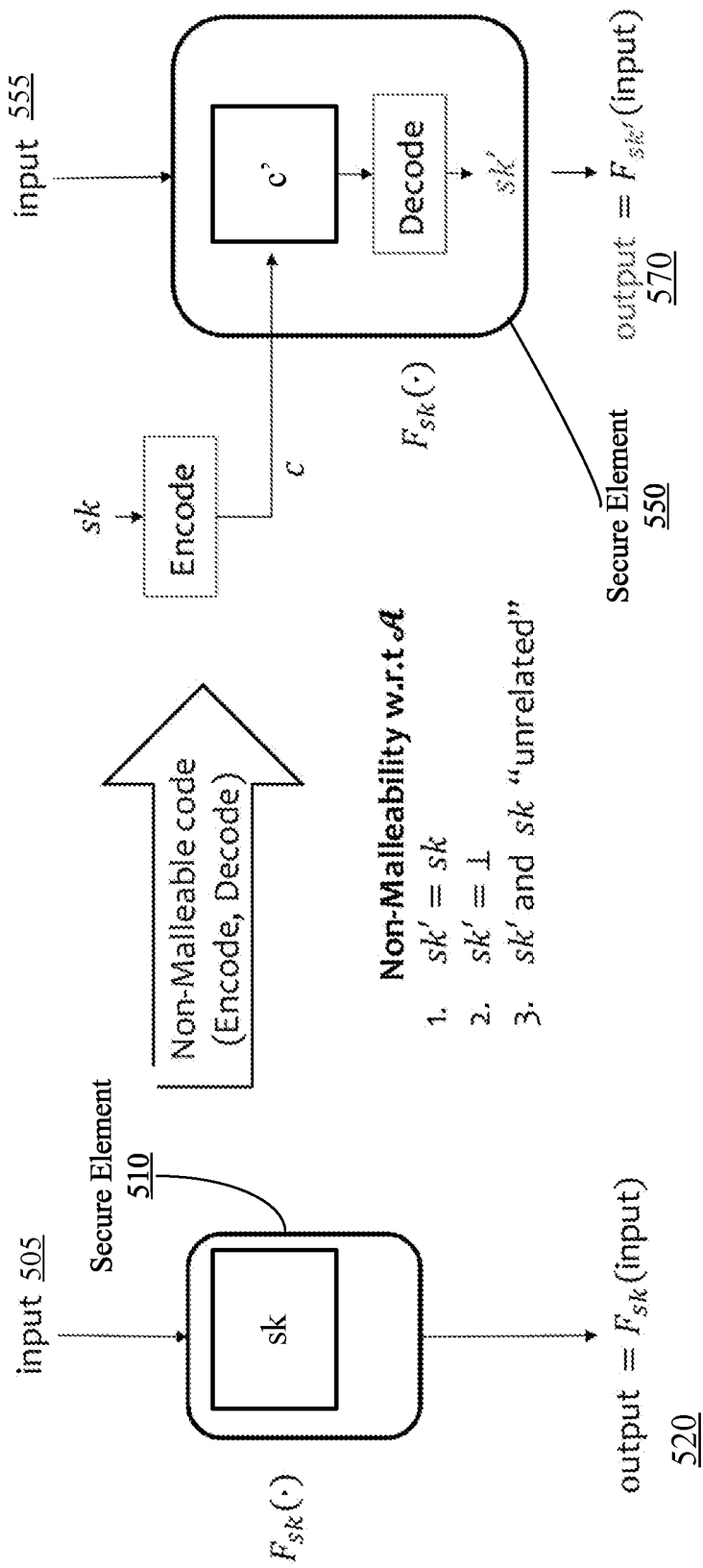
FIG. 5 illustrates a benefit of using non-malleable codes in the context of storing a secret in a secure element for performing a cryptographic function according to embodiments.

FIG. 5 illustrates a benefit of using non-malleable codes in the context of storing a secret in a secure element for performing a cryptographic function. FIG. 5 shows the example implementations from FIG. 2 and FIG. 4 side-by-side.

Secure element 510 stores a secret sk for performing a function $F_{sk}(\bullet)$ on input 505 to obtain output 520. Secure element 510 is susceptible to tampering attacks, as discussed above.

Secure element 550 stores a code c generated from secret sk using an encoding function. Secure element 550 decodes the code c to obtain the secret sk, which is then used for performing a function $F_{sk}(\bullet)$ on input 555 to obtain output 570.

As shown, the code c has been tampered to obtain c'. Thus, the decoding function is shown outputting sk'. Assuming the attacker can only modify the code c, the value for sk' should provide three possibilities for an output.

For possibility 1, sk'=sk, e.g., as the amount of change between c and c' is minimal, and thus the decoding function outputs the same value. For example, the decoding function can map more than one input to a same output. Such a procedure can be analogous to an "error-correction" mechanism, with one way to attain being adding redundancy into the codeword.

For possibility 2, the decoding function can detect that the decoded value does not correspond to code c', and thus tampering is detected. If tampering is detected, the decoding function can output a predetermined error character of 1.

How to determine such an inconsistency between code c' and the decoded value is described later.

For possibility 3, the decoding function determines that c' and the decoded value are consistent with each other, but such a result should only be possible when sk and sk' are unrelated and thereby sk' does not reveal any meaningful information about sk. This may occur if the attacker overwrites the encoding of sk with an encoding of a known sk'; clearly in this case sk' is independent of sk as it is already known to the attacker. For a non-malleable code, if a single bit is altered when using an encoding algorithm, the response becomes completely unrelated to the original message, and thus introducing a fault could not be used to deduce the secret. Being "unrelated" covers both error-detection and correct decoding with an unrelated sk'. An attacker would be unable to isolate a change relating to a single bit-flip due to the non-malleable property of the code. In the case of malware introduced to an application, even if the malicious program were to override a secret stored in the application with its own secret, it would be unable to infer any information about the original secret.

Secure element 550 can still be susceptible to tampering attacks, e.g., if the attacker can perform encoding and decoding. The particular encoding and decoding techniques may be public, e.g., as part of a standard. Thus, it is feasible that an attacker could generate malware that performs these functions.

C. Types of Attacks

Intuitively, an encoding scheme (Encode, Decode) is called non-malleable with respect to a class of tampering adversaries (modeled as functions or algorithms) $\mathcal{A}$ if for any adversary $A \in \mathcal{A}$ and any message x, the output Decode∘A∘Encode(x) is independent of x, unless it is equal to x. It is straightforward to see that $\mathcal{A}$ cannot contain all efficiently computable functions because in that case it is always possible to just decode a codeword c to x, modify (for example add 1) and re-encode x+1; hence one must consider a restricted class $\mathcal{A}$ that excludes functions able to encode. Therefore, one can focus on constructing encoding schemes that are non-malleable against a meaningful, broad class of tampering functions; notice that non-malleability against a broader $\mathcal{A}$ translates to protection against stronger tampering attacks.

In one type of attack, an adversary can be separated into two parts: a "big adversary" which is a probabilistic polynomial time (PPT) adversary with no space-bound, and a "small adversary" (e.g. malware) that is a space-bounded poly-time adversary. The big adversary can begin interacting with a challenger (e.g., a decoding device), and then output small adversaries which will then have access to a target codeword (or proof) and execute tampering in a space-bounded manner. If the small adversary has a huge description, it might not even fit into a small-space device (e.g. a mobile device), let alone executing tampering. So, it may be reasonable to assume that such adversary has a bounded size description. In particular, a class of space-bounded adversaries can be defined as $\mathcal{A}_{space}^{s,f}$ containing all poly-time adversaries that have a description of size at most f-bit and which require at most s-bit to execute.

One interesting tampering class is space-bounded tampering, in that the only restriction on $\mathcal{A}$ is that any (efficient) tampering algorithm in this class can only use a limited amount of memory. Space-bounded tampering captures the essence of mauling attacks performed by malware that infect small-space devices like mobile devices. However, for such tampering class, it is unreasonable to assume that a tampering algorithm cannot decode. For example, if decoding requires more space than what is available for the attacker, then the encoded secret becomes unusable inside the device. The encoding algorithm, on the other hand, can be reasonably space-intense and performed outside the device. Therefore, it is possible to assume the space-bounded adversary cannot perform encoding, therefore avoiding the aforementioned impossibility.

Moreover, even if $\mathcal{A}$ includes only Decode, "full-fledged" non-malleability is still not achievable. To see this, consider an attacker that decodes c, learns the message x and based on the first bit of x overwrites the memory of the device with a precomputed encoding—leaking the first bit (this can be extended to an attack that leaks any log(|x|) bits by tampering once). However, it may be possible to guarantee that the leakage is "not too much". This weaker notion may be defined as leaky non-malleability, which guarantees that an encoding scheme satisfying the notion would leak only a limited amount of information about x. Some encoding techniques may be use leaky non-malleability to resist tampering for a bounded number of attacks. That is, they can leak some information about the message x, but if more than a predetermined number of tampering attacks occur, the entire message x can be compromised. It is thus desireable to have an encoding scheme that is resistant to continuous attacks, where the number of tampering attacks is very large.

In some embodiments, the tampering algorithms can be assumed to be deterministic, sequential and (s,f)-total-space-bounded, where s, f∈ℕ are tunable parameters and are usually functions of the security parameter λ. The class of all such algorithms may be denoted by $\mathcal{A}_{space}^{s,f}$ or $\mathcal{A}_{space}$ for simplicity. Generally any $A \in \mathcal{A}_{space}^{s,f}$ will be often referred to as a space-bounded tampering algorithm. In some embodiments, the tampering algorithm can be assumed to have access to the public parameter may not be explicitly hardwired inside A and hence it is neither accounted for in the bound f nor in s. The public parameter pp may be considered to be untamperable. In some embodiments, the public parameter pp can be part of a read-only memory to which the attacker does not have write access.

In some embodiments, if the parameter f is such that adversaries from $\mathcal{A}_{space}^{s,f}$ can have valid encodings $(c_1, c_2)$ of two different messages hard-wired into their description, the leakage can be (approximately) at least as big as the size of the "extra persistent space" p−n, where p is the size of the persistent space and n is the size of the codeword. Otherwise, the distinguisher D can send a space-bounded adversary A with hard-wired $(c_1, c_2)$, which first copies any p−n bits of the target message into the extra persistent space and then depending on the first bit of that overwrites the target encoding with $c_1$ or $c_2$. Repeating this process, D learns the entire extra persistent space after only a few (θ≈p−n) tampering. Therefore, in some embodiments that allow sufficiently large f and any unbounded θ∈poly(λ), the leakage may contain p-n as an additive factor.

III. NON-INTERACTIVE PROOFS OF SPACE

A. Definition of NIPoS

In an interactive proof-of-space (PoS) protocol, a prover P interactively proves that they have "sufficient amount of space/memory" to a space-bounded verifier V. The entire proof can be represented as one single string, e.g., $\pi_{id}$, with respect to an identity id, allowing the prover P to non-interactively prove that they have sufficient amount of memory in a non-interactive proof-of-space (NIPoS). The verifier is able to verify the pair $(id, \pi_{id})$ within bounded space. Extractability of NIPoS guarantees that given an honestly generated pair (id,$\pi_{id}$), if a space-bounded "small adversary" A is able to compute another valid (i.e. correctly verified) pair (id',$\pi_{id'}$) such that id$\neq$ id', then id' can be efficiently extracted from random oracle queries made by the "big adversary" B (that has no space-restriction and may be represented by a PPT algorithm) given a "small hint".

Given a NIPoS, Faust et al.'s (Faust et al., 2017a) encoding scheme works as follows. On input a message x, the space-intense encoding algorithm runs the prover of NIPoS on an identity x to generate a proof $\pi_x$. The codeword c is the pair (x,$\pi_x$). The space-bounded decoding algorithm, on receiving c=(x,$\pi_x$), runs the (space-bounded) verifier. If the verification passes, it returns x, otherwise it returns ⊥ denoting the invalidity of c.

Intuitively, non-malleability follows from the guarantee provided by NIPoS; namely, whenever the small adversary tampers to a valid codeword (x',$\pi_{x'}$), the new message x' must be independent of the input message.

To be slightly more formal, to show that this encoding scheme is non-malleable against space-bounded attacker, one needs to simulate the tampering experiment with "a small leakage" on x. Given the extractability, the simulator can be constructed as follows: the leakage is obtained using the "small hint". As guaranteed by the extractability of NIPoS, since the "small hint" (of length $\eta$, say) is sufficient to extract id', each tampering can be simulated by first obtaining the hint as a leakage and then running the NIPoS-extractor to obtain id'. Clearly, this strategy runs into problem for unbounded continuous tampering as the overall leakage l becomes proportional to $\sigma \cdot \eta$ (where $\theta$ denotes the number of tampering queries).

At a high level, the NIPoS scheme is designed as follows. Let M be a memory-hard function and (Gen, Prove, Ver) a publicly verifiable scheme. The NIPoS prover on input id first queries the random oracle to obtain x:= $\mathcal{H}$ (id) and then runs the algorithm Prove on input x and outputs whatever the algorithm outputs, i.e. the value y:=M(x) and the proof of correct computation $\pi_{vc}$. The NIPoS verifier on input id and the proof of space (y,$\pi_{vc}$) first queries the random oracle to obtain x:= $\mathcal{H}$ (id) and the runs the algorithm Ver on input x, y, $\pi_{vc}$, and outputs whatever the algorithm outputs.

Intuitively, a NIPoS allows a prover to convince a verifier that she has a lot of space/memory. Importantly, the verification done on the verifier's side is space efficient.

A main building block of our NMC construction is Non-Interactive Proof of Space (for short NIPoS). Intuitively, a NIPoS allows a prover to convince a verifier that she has a lot of space/memory. Importantly, the verification done on the verifier's side is space efficient.

We start by recalling the definition of NIPoS from Faust et al. (Faut et al., 2017a) adjusted to (s,f,t)-bounded algorithms. We split the definitions completeness and extractability here. Then we define property called proof-extractability. We made some syntactical changes to the definition of extractability to align it with the proof-extractability definition. Finally, we define a new quantitative measure of NIPoS called uniqueness and show that uniqueness, when combined with extractability gives proof-extractability.

Definition 9 (Non-interactive proof of space (NIPoS)). For parameters $s_P,s_V,k_{pos},n_{pos} \in \mathbb{N}$ with $s_V \leq s < s_P$ an ($k_{pos},n_{pos}$, $s_P,s_V$)-non-interactive proof of space scheme (NIPoS for short) in the ROM consists of a tuple of PPT algorithms (Setup $\mathcal{H}$ ,P $\mathcal{H}$ ,V $\mathcal{H}$ ) with the following syntax.

Setup $\mathcal{H}$ ($1^\lambda$): This is a randomized polynomial-time (in $\lambda$) algorithm with no space restriction. It takes as input the security parameter and outputs public parameters $pp_{pos} \in \{0,1\}^*$.

$P_{pp_{pos}} \mathcal{H}$ (id): This is a probabilistic polynomial-time (in $\lambda$) algorithm that is $s_P$-space-bounded. It takes as input an identity id$\in \{0,1\}^{k_{pos}}$ and hard-wired public parameters $pp_{pos}$, and it returns a proof of space $\pi \in \{0,1\}^{n_{pos}}$.

$V_{pp_{pos}} \mathcal{H}$ (id,$\pi$): This algorithm is $s_V$-space-bounded and deterministic. It takes as input an identity id, hard-wired public parameters $pp_{pos}$, and a candidate proof of space $\pi$, and it returns a decision bit.

A NIPoS may have a completeness condition:
For all id$\in \{0,1\}^{k_{pos}}$, we have that $$Pr[V_{pp_{pos}}^{\mathcal{H}}(id, \pi) = 1: pp_{pos} \leftarrow Setup^{\mathcal{H}}(1^\lambda); \pi \leftarrow P_{pp_{pos}}^{\mathcal{H}}(id)] = 1,$$

where the probability is taken over the internal random coins of the algorithms Setup and P, and over the choice of the random oracle.

We define the extractability of a NIPoS separately as follows.

Definition 10 (Extractability of NIPoS). Let NIPoS= (Setup $\mathcal{H}$ , P $\mathcal{H}$ ,V $\mathcal{H}$ ) be an ($k_{pos},n_{pos},s_P,s_V$)-non-interactive proof of space scheme. Let s, f, t, $\eta \in \mathbb{N}$ and $\varepsilon_{pos} \in [0,1)$ be parameters with $s_V \leq s < s_P$. Then a NIPoS is (s,f,t,$\eta$,$\varepsilon_{pos}$)-extractable (Ext-NIPoS) if there exists a polynomial-time deterministic algorithm K (the knowledge extractor) and a deterministic efficiently computable function $F_{hint}$:$\{0, 1\}^* \rightarrow \{0,1\}^\eta$ such that for any probabilistic polynomial-time algorithm B, we have $$Pr[G_{B,id}^{ext}(\lambda) = 1] \leq \varepsilon_{pos},$$

for the game $G_{B,id}^{ext}$ ($\lambda$) defined as follows:
Game $G_{B,id}^{ext}(\lambda)$:
1. Sample $pp_{pos} \rightarrow$Setup $\mathcal{H}$ ($1^\lambda$) and $\pi \leftarrow P_{pp_{pos}} \mathcal{H}$ (id).
2. Let A$\leftarrow B_{pp_{pos}} \mathcal{H}$ (id,$\pi$) such that A$\in \mathcal{A}_{space}^{s,f}$ (if this condition fails, then output 0 and stop).
3. Let ($\tilde{id}$,$\tilde{\pi}$):=A $\mathcal{H}$ (id,$\pi$).
4. Let z:=$F_{hint}$($pp_{pos}$,Q $\mathcal{H}$ (B),$\tilde{id}$).
5. Let $\alpha$:=K($pp_{pos}$,Q $\mathcal{H}$ (B),z).
6. Output 1 if and only if: (i) $V_{pp_{pos}} \mathcal{H}$ ($\tilde{id}$,$\tilde{\pi}$)=1; (ii) $\tilde{id} \neq$id and (iii) $\tilde{id} \neq \alpha$; otherwise output 0,
where the set Q $\mathcal{H}$ (B) contains the sequence of queries of B to $\mathcal{H}$ and the corresponding answers, and where the probability is taken over the coin tosses of Setup, B, P and over the choice of the random oracle.

Note that, we made two changes from the one used in Faust et al. (Faut et al., 2017a): first we introduce a new hint-producing function which can return a "small string" (for example, the index of $\tilde{id}$ in the RO table Q $\mathcal{H}$ (B)) and given that hint, the extractor can now find out the target identity from the same table. Secondly, the extractor here only returns the target identity instead of all identities found in the table (as done in Faust et al. (Faut et al., 2017a)). In embodiments, the parameter $\eta$ may be small, as otherwise the definition is trivially satisfied. The final measure of leakage in the NMC construction can be controlled by the size of this hint.

B. Proof-Extractability and Uniqueness

The above discussion shows that we possibly need a stronger guarantee from the underlying NIPoS to make a CSNMC. Towards that, a stronger property of a NIPoS can be introduced called proof-extractability (PExt-NIPoS). It guarantees that, given a "small hint" (e.g., of length $\eta$'), it is possible to construct a stronger extractor that extracts not only the changed identity, but also the changed proof: (id',$\pi_{id'}$). Intuitively, this means that if a small adversary computes a valid pair (id',$\pi_{id'}$), then the "big adversary" must have computed the entire proof $\pi_{id'}$ (as opposed to a part of the proof as for NIPoS) outside the small-space device.

Extractability guarantees that if the space bounded adversary A successfully tampers to a new pair ($\widetilde{id}$,$\pi$), the identity $\widetilde{id}$ can be extracted from the query table of the algorithm B, i.e., the pair ($\widetilde{id}$,$\pi$) was (partially) precomputed by B. Knowledge of $\widetilde{id}$ does not generally imply knowledge of the entire pair ($\widetilde{id}$,$\pi$). This is because there might be many different $\pi$ for which the verification is correct, unless, of course, there is a unique such $\pi$. In order guarantee extraction of the entire pair ($\widetilde{id}$,$\pi$), we need NIPoS to satisfy a stronger extractability property, called Proof-Extractability.

Definition 11 (Proof-Extractability of NIPos) Let NIPoS:=(Setup $\mathcal{H}$, P $\mathcal{H}$, V $\mathcal{H}$) be a ($k_{pos}$,$n_{pos}$,$s_P$,$s_V$)-non-interactive proof of space scheme. Lets, f, t, $\eta \in \mathbb{N}$ and $\varepsilon_{p-ext} \in$ [0,1) be parameters such that $s_V \leq s < s_P$. Then NIPoS is called (s,f,t,$\eta$,$\varepsilon_{p-ext}$)-proof extractable (PExt-NIPoS) if there exists a polynomial time deterministic algorithm K (the proof-extractor) and an efficiently computable deterministic function $F_{hint}$:$\{0,1\}^* \rightarrow \{0,1\}^\eta$ such that for any PPT algorithm B and any identity id $\in \{0,1\}^{k_{pos}}$, it holds that $$Pr[G_{B,id}^{pext}(\lambda) = 1] \leq \varepsilon_{p-ext},$$

for the game $G_{B,id}^{pext}(\lambda)$ defined as follows:
Game $G_{B,id}^{pext}(\lambda)$:
1. Sample $pp_{pos} \rightarrow$ Setup $\mathcal{H}$ ($1^\lambda$) and $\pi \leftarrow P_{pp_{pos}} \mathcal{H}$ (id).
2. Let $A \leftarrow B_{pp_{pos}} \mathcal{H}$ (id,$\pi$) such that $A \in \mathcal{A}_{space}^{s,f}$ (if this condition fails, then output 0 and stop).
3. Let ($\widetilde{id}$,$\pi$):=$A \mathcal{H}$ (id,$\pi$).
4. Let z:=$F_{hint}$($pp_{pos}$,Q $\mathcal{H}$ (B), ($\widetilde{id}$,$\widetilde{\pi}$)).
5. Let $\alpha$:=K($pp_{pos}$,Q $\mathcal{H}$ (B),z).
6. Output 1 if and only if: (i) $V_{pp_{pos}} \mathcal{H}$ ($\widetilde{id}$,$\widetilde{\pi}$)=1; (ii) $\widetilde{id} \neq$id and (iii) $\widetilde{id} \neq$id; otherwise output 0,
where the set Q $\mathcal{H}$ (B) is the random oracle query table of B. Note that B does not make RO queries after outputting the small adversary A. The probability is over the choice of the random oracle, and the coin tosses of Setup, B.

In the above definition, the hint-producing function takes the pair ($\widetilde{id}$,$\widetilde{\pi}$) as opposed to only $\widetilde{id}$ as in Definition 10. Intuitively this means that, given some small hint, the extractor does not only return the changed identity, but the identity-proof pair. Clearly this makes the later definition stronger.

As mentioned above, when there is a unique valid proof corresponding to each identity, then proof-extractability reduces to simply extractability. Nevertheless, it may also be possible that only a part of the proof is uniquely determined. We formalize this by the following definition.

Definition 12 (Uniqueness of NIPoS) Let NIPoS:= (Setup $\mathcal{H}$, P $\mathcal{H}$, V $\mathcal{H}$) be a ($k_{pos}$,$n_{pos}$,$s_P$,$s_V$)-NIPoS. Then NIPoS is called ($u_{pos}$,$\varepsilon_{unique}$)-unique (where $u_{pos} \leq n_{pos}$, $u_{pos} \in \mathbb{N}$ and $\varepsilon_{unique} \in negl(\lambda)$) if for any $\lambda \in \mathbb{N}$, there is a deterministic function J:$\{0,1\}^* \times \{0,1\}^{k_{pos}} \rightarrow \{0,1\}^{u_{pos}}$ such that for $pp_{pos} \leftarrow$ Setup $\mathcal{H}$ ($\lambda$), any identity id$\in \{0,1\}^{k_{pos}}$ and any $\pi \in \{0,1\}^{n_{pos}}$, if $V_{pp} \mathcal{H}$ (id,$\pi$)=1, then J($pp_{pos}$,id)=$\pi$[1 . . . $u_{pos}$] with probability at least 1-$\varepsilon_{unique}$ (where the probability is over the randomnesses of Setup $\mathcal{H}$ and P $\mathcal{H}$).

Intuitively, the definition can state that for a valid proof $\pi$, a part of $\pi$ (first $u_{pos}$ bits in this case) can be uniquely and efficiently determined given the id and the public parameters pp with overwhelming probability.

In the following lemma, we formally show that uniqueness and extractability together imply proof-extractability. To see this, observe that, e.g., maximal uniqueness implies that given $\widetilde{id}$, the corresponding $\pi_{id}$ is fixed and hence it suffices to provide the PExt-NIPoS hint-producer only with $\widetilde{id}$.

Lemma 1 Let NIPoS:=(Setup $\mathcal{H}$, P $\mathcal{H}$, V $\mathcal{H}$) be a ($k_{pos}$, $n_{pos}$,$s_P$,$s_V$)-NIPoS that is ($u_{pos}$,$\varepsilon_{unique}$)-unique and (s,f,t,$\eta$, $\varepsilon_{pos}$)-extractable. Then NIPoS is (s,f,t,$\eta$',$\varepsilon_{p-ext}$)-proof-extractable where $$\eta' = \eta + n_{pos} - u_{pos} \varepsilon_{p-ext} \leq \varepsilon_{pos} + \varepsilon_{unique}$$

Proof. Given the hint-producing function $F_{hint}$ and the extractor K for the extractable NIPoS we construct a hint-producing function $F_{hint}'$ and an extractor K' for proof-extractability as follows:

$F_{hint}'$: It takes ($pp_{pos}$,Q $\mathcal{H}$ (B),l')) as input and runs $F_{hint}$ on ($pp_{pos}$,Q $\mathcal{H}$ (B), $\widetilde{id}$) to obtain l. It returns l' where l'=l$\|\beta$ for $\beta$:=$\pi$[$u_{pos}$+1 . . . $n_{pos}$].

K': It takes ($pp_{pos}$,Q $\mathcal{H}$ (B),l') as input, parses l'=l$\|\beta$. Then it runs $\alpha$:=K($pp_{pos}$,Q $\mathcal{H}$ (B),l) and $\gamma$:=J($pp_{pos}$,$\alpha$). It returns ($\alpha$,$\alpha$') where $\alpha$'=$\gamma\|\beta$.

It is clear that, whenever the standard extractor K is able to extract the correct $\widetilde{id}$, the proof-extractor will be able to extract the correct pair ($\widetilde{id}$,$\pi$) as the part of it was uniquely derived by J and the rest of it is obtained from the additional hint. Therefore, the only case when K' would fail is exactly when (i) K fails or (ii) J fails. Hence we have $\varepsilon_{p-ext} \leq \varepsilon_{pos}$+ $\varepsilon_{unique}$. On the other hand, since $F_{hint}'$ needs to output an additional hint of $\widetilde{\pi}$[$u_{pos}$+1 . . . $n_{pos}$] the hint $\eta$' is more than $\eta$ by exactly $n_{pos} - u_{pos}$ and hence we have $\eta' = \eta + n_{pos} - u_{pos}$. This completes the proof If a NIPoS has a special property, called uniqueness, then it satisfies proof-extractability. Intuitively, uniqueness means for a fixed identity id, there exists exactly one string $\pi_{id}$ such that $\pi_{id}$ verifies correctly with respect to id. Unfortunately, we do not know how to construct a NIPoS with such property (even under heuristic assumptions). Therefore, to have a more relaxed and fine-grained notion, we define uniqueness as a quantitative measure: a NIPoS has $u_{pos}$-uniqueness means that, for any identity id, the first $u_{pos}$ bits of any valid $\pi_{id}$ are fixed and can be computed efficiently with overwhelming probability. Intuitively, the definition can state that for a valid proof $\pi$ a part of $\pi$ (first $u_{pos}$ bits in this case) can be uniquely and efficiently determined given the id and the public parameters pp with overwhelming probability.

Embodiments show that any NIPoS can be upgraded to a PExt-NIPoS if it has uniqueness, which we define as a quantitative measure of a NIPoS. Notice that the parameters of the resulting PExt-NIPoS (and consequently the CSNMC scheme yielded) is directly related to the uniqueness parameter of the starting NIPoS. For example, if a NIPoS has "maximal uniqueness", then the resulting CSNMC incurs "minimal leakage", which is equal to p-|c| bits, where p is the available (persistent) space. In embodiments, the entire space in the device is split into two parts, the persistent space which is reusable, and the transient space which is refreshed after each tampering. An impossibility shown in Faust et al. (Faut et al., 2017a) restricts the persistent space to remain relatively small when $\theta$ is unbounded. In fact, the NIPoS used in Faust et al. (Faut et al., 2017a) has poor uniqueness parameters and thus, when adapted to our proof-extractability technique, yields a CSNMC which suffers from a leakage that is as large as $\approx p-|x|$.

Figure 6:
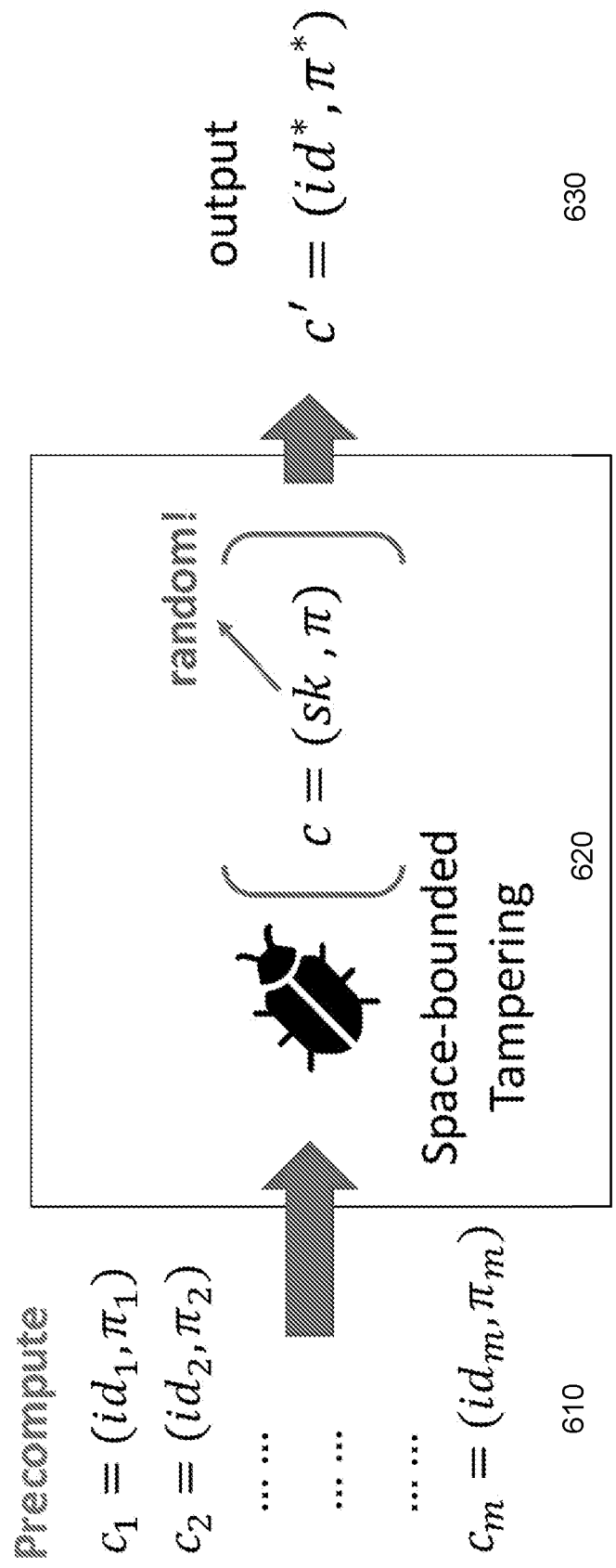
FIG. 6 shows an example of an attacker not able to successfully perform an attack on an encoded secret stored in a device due to proof-extractability of the encoding function according to embodiments.

FIG. 6 shows an example of an attacker not able to successfully perform an attack on an encoded secret stored in a device due to proof-extractability of the encoding function according to embodiments.

At block 610, attacker A can generate a plurality of potential secrets $id_1, id_2, \ldots, id_m$. The attacker A can then generate a proof for each of the potential secrets $\pi_1, \pi_2, \ldots, \pi_m$. The attacker A can then compute a plurality of codewords $c_1, c_2, \ldots, c_m$ using a the plurality of potential secrets $id_1, id_2, \ldots, id_m$ and the plurality of proofs $\pi_1, \pi_2, \ldots, \pi_m$. The attacker A may have an unlimited ability to precompute and store proofs $\pi_1, \pi_2, \ldots, \pi_m$. The codewords $c_1, c_2, \ldots, c_m$ may then be provided to a space-bounded attacker. The number of codewords $c_1, c_2, \ldots, c_m$ provided to the space-bounded attacker may depend on the size of the space bounded attacker. For example, each codeword $c_1, c_2, \ldots, c_m$ may have a size of 1 MB and the space-bounded attacker may have 10 MB of space. The space-bounded attacker may tamper with the secure element of the device.

At block 620, there may be a codeword c stored on the secure element of the device, comprising a secret key sk and a proof π. The secret key sk may be a random value (e.g., generated by a provisioning device) and the proof π may be generated by the provisioning device based on the secret key sk. The space-bounded attacker may then attempt to use one of the pre-computed codewords $c_1, c_2, \ldots, c_m$ to affect the verification process on the device.

At block 630, the output may be a codeword c' based on a secret id* and a proof π*. However, the space-bounded attacker may not be able to use information about the secret key sk or the proof π on the secure element. Thus there are only two options: c=c', and the tampering was unsuccessful, or c' is verified and output because it was based on a valid pair submitted by the attacker A and has no relationship to the secret key sk. The space-bounded attacker does not have enough space to modify the secret key sk and generate a new proof. The space-bound attacker also may not be able to use part of a proof to generate a valid proof based on the secret key, because the non-interactive proof of space is proof-extractable.

IV. CONSTRUCTING PEXT-NIPOS FROM CHALLENGE-HARD GRAPHS

A. Graph Labeling and Graph Pebbling

Memory hard functions may be based on graph labeling or graph pebbling. The graph labeling or pebbling may be done using directed acyclic graphs (DAGs).

Figure 7:
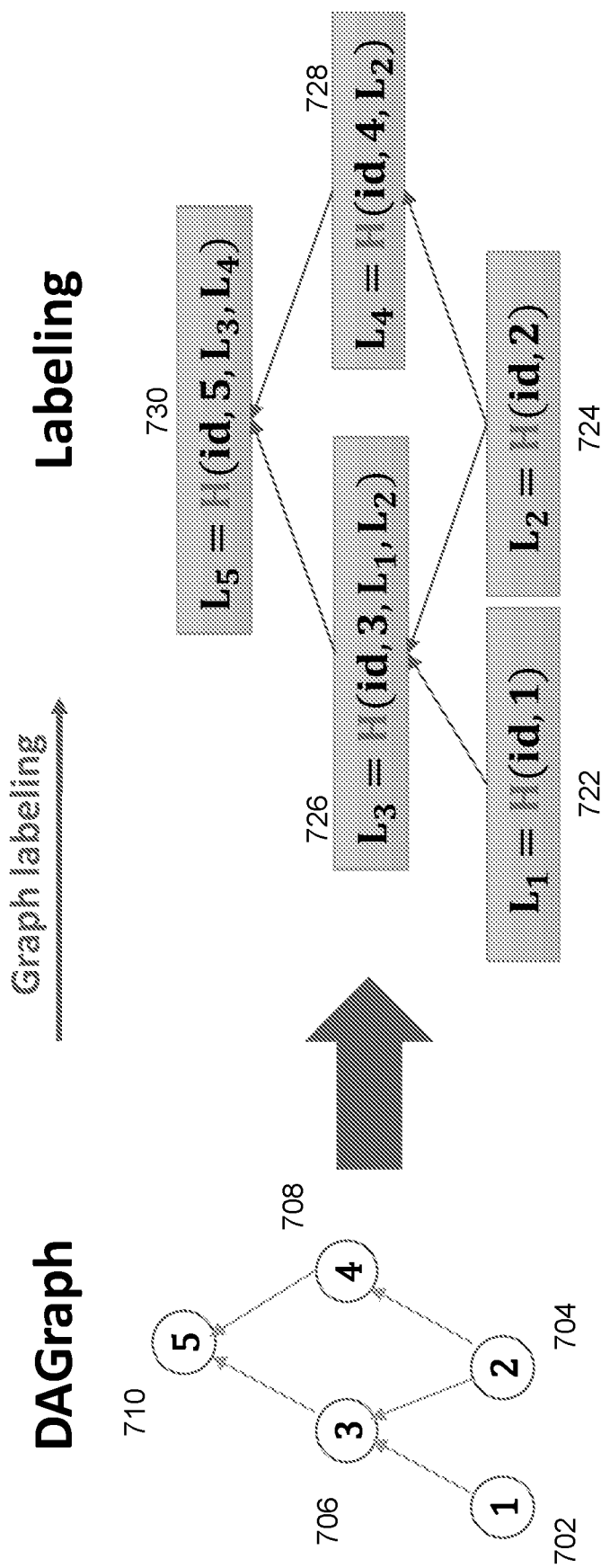
FIG. 7 shows an example of a graph labeling according to embodiments.

FIG. 7 shows an example of a graph with 5 nodes. Each node may have a number. There may be a hash function H. The nodes in the bottom layer of the may be labeled by hashing the number of the node with a secret id. For example, node 702 may be numbered as 1 and may have a label 722 of $L_1$=H(id, 1). Subsequent nodes on higher layers may be labeled with the secret id, the number of the node, and the label of all nodes on which the node depends. For example, node 706 may be numbered as 3 may have a label 726 of $L_3$=H(id, 3, $L_1$, $L_2$). This may continue for all nodes in the graph. Because each labeling depends on each of the labelings below it, it cannot be computed in parallel and each labeling must be stored simultaneously. Thus a full labeling L can be generated and stored. In order to generate the labeling L, the generating device must store the labeling of each graph. A proof π can then be generated based on the labeling L or the hash of the labeling L. The proof π may be generated with a probabilistic proof function. The proof function may select a number of challenge nodes, representing that the full labeling has been computed.

Labeling of a graph can be described. Let $\mathcal{H}: \{0,1\}^* \to \{0,1\}^n$ $\mathcal{H}$ be a hash function (often modeled as a random oracle). The $\mathcal{H}$-labeling of a graph G is a function which assigns a label to each vertex in the graph; more precisely, it is a function label: $V \to \{0,1\}^n$ $\mathcal{H}$ which maps each vertex $v \in V$ to a bit string label(v):= $\mathcal{H}$ ($q_v$), where we denote by $|\{v^{(1)}, \ldots, v^{(deg)}\}|=\deg(v)$ and let $$q_v := \begin{pmatrix} v \text{ if } v \text{ is an input vertex,} \\ v \parallel label(v^{(1)}) \parallel \ldots \parallel label(v^{(deg)}) \text{ otherwise.} \end{pmatrix}$$

An algorithm A labels a subset of vertices W ⊆ V if it computes label(W). Specifically, A labels the graph G if it computes label(V).

Additionally, for m≤|V|, we define the $\mathcal{H}$-labeling of the graph G with m faults as a function label: $V \to \{0,1\}^n$ $\mathcal{H}$ such that, for some subset of vertices M ⊂ V of size m, label(v)≠ $\mathcal{H}$ ($q_v$),for every $v \in M$ label(v)=($q_v$),for every $v \in V \setminus M$.

label(v)= $\mathcal{H}$ ($q_v$) for every $v \in V \setminus M$, and label(v)≠ $\mathcal{H}$ ($q_v$) for every $v \in M$. Sometimes we refer to labeling with faults as partial labeling.

When $\mathcal{H}$ is modeled as a random oracle one can show an interesting property about graph labeling as we present next as a lemma that appeared in form of a discussion in Ling Ren and Srinivas Devadas. It is based on an observation previously made in Stefan Dziembowski et al. (Dziembowski et al., 2015).

Lemma 2 Suppose $\mathcal{H}$ is modeled as a random oracle. Let A $\mathcal{H}$ be an (s,t)-bounded algorithm which computes the labeling of a DAG G with m∈ℕ faults. Then there exists an (s+m·n $\mathcal{H}$ ,t)-bounded algorithm Ã $\mathcal{H}$ that computes the labeling of G without faults but gets m correct labels to start with (they are initially stored in the memory of Ã $\mathcal{H}$ and sometimes called initial labels).

Intuitively the above lemma follows because the algorithm Ã $\mathcal{H}$ can overwrite the additional space it has, once the initial labels stored there are not needed.

A pebbling game can now be described. The pebbling of a DAG G=(V,E) is defined as a single-player game. The game is described by a sequence of pebbling configurations P=($P_0, \ldots, P_T$), where $P_i \subseteq V$ is the set of pebbled vertices after the i-th move. In our model, the initial configuration $P_0$ does not have to be empty. The rules of the pebbling game are the following. During one move (translation from $P_i$ to $P_{i+1}$), the player can place one pebble on a vertex v if v is an input vertex or if all predecessors of v already have a pebble. After placing one pebble, the player can remove pebbles from arbitrary many vertices. The sequence P can be said to pebble a set of vertices W⊆V if W⊆$\cup_{i \in [0,T]} P_i$.

The time complexity of the pebbling game P is defined as the number of moves t(P):=T. The space complexity of P is defined as the maximal number of pebbles needed at any pebbling step; formally, s(P):=$\max_{i \in [0,T]}\{|P_i|\}$.

Ex-post-facto pebbling of a DAG (in the random oracle model) can now be described. Let $\mathcal{H}: \{0,1\}^* \to \{0,1\}^n$ $\mathcal{H}$ be a random oracle. Let A $\mathcal{H}$ be an algorithm that computes the (partial) $\mathcal{H}$-labeling of a DAG G. The ex-post-facto pebbling bases on the transcript of the graph labeling. It processes all oracle queries made by $A^{\mathcal{H}}$ during the graph labeling (one at a time and in the order they were made). Informally, every oracle query of the form $q_v$, for some $v \in V$, results in placing a pebble on the vertex v in the ex-post-facto pebbling game. This provides us a link between labeling and pebbling of the graph G. The formal definition follows.

Let $\mathcal{H}:\{0,1\}^* \to \{0,1\}^n \mathcal{H}$ be a random oracle and $Q^{\mathcal{H}}$ a table of all random oracle calls made by $A^{\mathcal{H}}$ during the graph labeling. Then we define the ex-post-facto pebbling P of the graph G as follows:

The initial configuration $P_0$ contains every vertex $v \in V$ such that label(v) has been used for some oracle query (e.g. some query of the form $\mathcal{H}(\cdot \cdot \cdot \|label(v)\| \ldots)$) at some point in the transcript but the query $q_v$ is not listed in the part of the transcript preceding such query.

Assume that the current configuration is $P_i$, for some $i \geq 0$. Then find the next unprocessed oracle query which is of the form $q_v$, for some vertex v, and define $P_{i+1}$ as follows:
(a) Place a pebble on the vertex v.
(b) Remove all unnecessary pebbles. A pebble on a vertex v is called unnecessary if label(v) is not used for any future oracle query, or if the query $q_v$ is listed in the succeeding part of the transcript before label(v) is used in an argument of some other query later. Intuitively, either label(v) is never used again, or $A^{\mathcal{H}}$ anyway queries $q_v$ before it is used again.

Lemma 3 (Labeling Lemma (in the ROM)) Let $\mathcal{H}:\{0, 1\}^* \to \{0,1\}^n \mathcal{H}$ be a random oracle. Let G be a DAG. Consider an (s,t)-bounded adversary $A^{\mathcal{H}}$ which computes the $\mathcal{H}$-labeling of the graph G. Also assume that $A^{\mathcal{H}}$ does not guess any correct output of $\mathcal{H}$ without querying it. Then the ex-post facto pebbling strategy P described above pebbles the graph G, and the complexity of P is $$s(P) \leq \frac{s}{n_{\mathcal{H}}} \text{ and } t(P) \leq t.$$

$$s(P) \leq \frac{s}{n_{\mathcal{H}}} \text{ and } t(P) \leq t.$$

Proof. By definition of ex-post-facto pebbling, it is straightforward to observe that if $A^{\mathcal{H}}$ computes the $\mathcal{H}$-labeling of the graph G, then the ex-post-facto pebbling P pebbles the graph. Since we assume that the adversary does not guess the correct label, the only way $A^{\mathcal{H}}$ can learn the label of the vertex v is by querying the random oracle. The bound on t(P) is immediate. Again, by definition of the ex-post-facto pebbling, there is no unnecessary pebble at any time. Thus, the number of required pebbles is equal to the maximum number of labels that $A^{\mathcal{H}}$ needs to store at once. Hence, the space bound follows directly from the fact that each label consists of $n_{\mathcal{H}}$ bits and that the algorithm $A^{\mathcal{H}}$ is s-space bounded.

B. Challenge Hard Graphs

We define a new family of "memory-hard graphs" called challenge-hard-graphs (CHG) and construct PExt-NIPoS for the class of space-bounded adversaries $\mathcal{A}_{space}^{s,f}$ from that. We provide two instantiations of CHG that may be used in embodiments, although other instantiations may be used as well. The first one extends the stack of local expanders (SoLEG) used by Ren and Devadas (Ren and Devadas, 2016), in the context of proof-of-space, and the second one uses the graph designed by Paul et al. (Paul et al., 1976) and used by Dziembowski et al. (Dziembowski et al., 2015). Both of the constructions use standard graph-pebbling techniques to ensure memory-hardness (and challenge-hardness) and work in the random oracle model. Plugging-in these PExt-NIPoS constructions into the encoding scheme of Faust et al. (Faut et al., 2017a), we obtain CSNMC schemes with "almost minimal leakage" $l \approx p - |c|$.

Recall that, special types of DAGs are used for memory-hardness and for constructing proof-of-space via graph-labeling games. Usually, labels not "compressible". In a graph-based proof of space constructions (e.g. Ling Ren and Srinivas Devadas (Ren and Devadas, 2016)), an honest prover computes the labeling of the entire graph ensuring the usage of significant amount of space. Small-space verification is done by checking the labels of a few randomly selected nodes (or challenge nodes) of the graph—this guarantees that the "small adversary" cannot put too many fake labelings (a.k.a. faults) without storing them and thereby ending up using less memory.

However, such verification leaves room for computing a small part of the proof inside the small-space device—for example, consider a multi-layered DAG (e.g. a stack of bipartite graphs), for which a "big adversary" computes the labeling of the entire graph except for a single node in the last layer, and the "small adversary" easily computes the label of the node inside the small-space device. As a result the entire proof cannot be extracted only from B's RO queries, making proof-extractability impossible.

To remedy this issue, we replace the traditional memory hard graphs with CHG, which contains another carefully chosen set of challenges and guarantees that, even if a "big adversary" computes the labeling of the entire graph except for a few nodes and send a bounded hint to the "small adversary", it is still infeasible to compute the labels of the new challenge nodes with a small-space device. Let us remark that such a guarantee is only possible when the small adversary has a small description size (i.e., the hint from the "big adversary" is small), as otherwise the small adversary, for example, can hard-code the entire labeling for whole graph including all possible challenges, making challenge hardness impossible.

Informally challenge-hard graphs satisfy the following property with respect to graph pebbling: with small budget on the number of pebbles available (for example if an algorithm is space-bounded) no pebbling strategy can put pebbles on multiple random challenge vertices of the graph in a reasonable amount of time. Thus for a challenge-hard graph comprising a plurality of challenge nodes, in addition to other graph nodes, determining a graph labeling for the plurality of challenge nodes may require at least N bytes of memory. The N bytes of memory may be available an encoding computer but not available to a small-space attacker. The plurality of challenge nodes may be randomly selected from the set of nodes that comprise the challenge-hard graph. Successfully determining a graph labeling for the plurality of challenge nodes may occur with exponential time. Put another way, a device with a small available space (e.g., space-bounded) may not have a way to successfully complete multiple challenge vertices of a challenge-hard graph in a reasonable time. The property should hold even if the player gets a few (but not too many) pebbles on arbitrary vertices at the beginning.

Challenge-hard graphs may be graphs where the entire labeling require a lot of space. A proof based on a challenge-hard graph may be produced with the entire labeling. In some embodiments, the associated proof cannot be produced without storing the entire label, and the label may be the result of a memory-hard function. This may be in contrast to graph labelings based on other memory hard graphs, where the proof can be produced with only a portion of the graph labeling stored. This can better enforce space restrictions on the encoding process.

Challenge hard graphs are parameterized by the following variables: $N_c$, $\beta$, $N$, $\tau_c$, $t$, $\varepsilon$, where N is the size of the graph; $\tau_c$ is the number of challenge nodes, where all the challenges are in a pre-defined target set $V_c$; $N_c$ is the size of the target set $V_c$; $\beta \cdot N_c = \Omega(N_c)$ is the budget on the number of pebbles available; t is an upper bound on the running time of pebbling strategies; and E is an upper bound on the winning probability of the pebbling challenge game.

Challenge Hard Graphs (NIPoS) can be defined as follows. A family of directed acyclic graphs $\{G_\lambda\}_{\lambda \in \mathbb{N}}$ (with constant in-degree) is ($\beta$, $N_c$, $N$, $\tau_c$, $t$, $\varepsilon$)-challenge-hard (where $\beta \in (0,1)$ is a constant, and other parameters are functions of $\lambda$), if for every $\lambda \in \mathbb{N}$ and graph $G = G_\lambda = (V,E)$ (with $N = N(\lambda)$ vertices), there exist $\tau_c$ target sets (possibly with overlapping) $V_c^{(1)}, \ldots, V_c^{(\tau_c)} \subseteq V$ such that the union of the target sets $$V_c := V_c^{(1)} \cup \ldots \cup V_c^{(\tau_c)} \subseteq V$$

has $N_c$ vertices, and the following property is satisfied:

For any pebbling strategy $B = (B_1, B_2)$ it holds that $$Adv_{B,\beta,t,\tau_c,G}^{peb}(\lambda) := Pr[G_{B,\beta,t,\tau_c,G}^{peb}(\lambda) = 1] \leq \varepsilon,$$

where the pebbling game $G_{B,\beta,t,\tau_c,G}^{peb}(\lambda)$ is defined as follows.

Game $G_{B,\beta,t,\tau_c,G}^{peb}(\lambda)$:
(a) Let $P_0 \leftarrow B_1$ be a pebbling configuration, where $|P_0| \leq \beta \cdot N_c$.
(b) Let chal $\leftarrow \mathcal{D}^{\tau_c}$ be $\tau_c$ random challenge vertices (possibly with overlapping), where $\mathcal{D}^{\tau_c}$ is the uniform distribution over $V_c^1 \times \ldots \times K_c^{(\tau_c)}$.
(c) Let $P = (P_0, \ldots, P_{t(P)}) \leftarrow B_2(P_0, \text{chal})$ be a pebbling strategy.
(d) Output 1 iff
P follows the rule of a sequential pebbling strategy.
For every $i \in \{0, \ldots, t(P)\}$, it holds that $|P_i| \leq \beta \cdot N_c$.
chal $\subseteq P_0 \cup \ldots \cup P_{t(P)}$.
$t(P) \leq t$.

We define $N_c/\tau_c$ and $N/N_c$, as the challenge sparseness and graph compactness of G.

Intuitively, challenge sparseness defines what fraction of the target nodes will be challenged. Graph compactness determines what fraction of all node in the graph are in the target set. These two metrics of CHG can affect the determination of the parameters of the NIPoS and the encoding schemes.

Some embodiments use localized expander graphs as well.

A ($N_c$, $\gamma_1$, $\gamma_2$)-bipartite expander, for $0 < \gamma_1 < \gamma_2 < 1$, is a DAG with $N_c$ sources and $N_c$ sinks such that any $\gamma_1 N_c$ sinks are connected to at least $\gamma_2 N_c$ sources. We can define a DAG $G'_{N_c,k_G,\gamma_1,\gamma_2}$ by stacking $k_G$ ($\in \mathbb{N}$) bipartite expanders. Informally, stacking means that the sinks of the i-th bipartite expander are the sources of the i+1-st bipartite expander. It is easy to see that such a graph has $N_c(k_G+1)$ nodes which are partitioned into $k_G+1$ sets (which we call layers) of size $N_c$. A Stack of Localized Expander Graphs (SoLEG) is a DAG $G_{N_c,k_G,\gamma_1,\gamma_2}$ obtained by applying the transformation called localization (Ren and Devadas, 2016) on each layer of the graph $G'_{N_c,k_G,\gamma_1,\gamma_2}$.

Lemma 4 Let $\mathcal{H}:\{0,1\}^* \to \{0,1\}^{n\mathcal{H}}$ be a random oracle. Let $G_{N_c,k_G,\gamma_1,\gamma_2}$ be a SoLEG where $\beta := \gamma_2 - 2\gamma_1 > 0$. Let $P = (P_0, \ldots, P_{t(P)})$ be a pebbling strategy that pebbles at least $\gamma_1 N_c$ output vertices of the graph $G_{N_c,k_G,\gamma_1,\gamma_2}$ which were not initially pebbled, where the initial pebbling configuration is such that $|P_0| \leq \beta N_c$, and the space complexity of P is bounded by $s(P) \subseteq \beta N_c$. Then the time complexity of P has the following lower bound:

$$t(P) \geq 2^{k_G} \gamma_1 N_c.$$

Then the time complexity of P has the following lower bound: $t(P) \geq 2^{k_G} \gamma_1 N_c$.

Lemma 5 Let $G_{N_c,k_G,\gamma_1,\gamma_2}$ be a SoLEG and $\mathcal{H}:\{0,1\}^* \to \{0,1\}^{n\mathcal{H}}$ be a random oracle. There exists a polynomial time algorithm A$\mathcal{H}$ that computes the $\mathcal{H}$-labeling of the graph $G_{N_c,k_G,\gamma_1,\gamma_2}$ in $N_c n \mathcal{H}$-space.

C. Construction of PExt-NIPoS from CHG

Now a PExt-NIPoS construction based on challenge-hard graphs can be described. The construction may satisfy proof-extractability.

The scheme consists of three algorithms (Setup$\mathcal{H}$, P$\mathcal{H}$, V$\mathcal{H}$) that use the following ingredients:

A DAG G=(V,E) with N=|V| vertices and maximal in-degree deg$\in$O(1), which has $\tau_c$ target sets [Note that the target sets can have overlapping parts, that is they may share some nodes] $V_c^{(1)}, \ldots, V_c^{(\tau_d c)} \subseteq V$ such that $$V_c := V_c^{(1)} \cup \ldots \cup V_c^{(\tau_c)} \subseteq V$$

and $V_c$ has $N_c$ vertices.

A set of random oracles $\{\mathcal{H}_{id}\}_{id \in \{0,1\}^{k_{pos}}} \cup \{\mathcal{H}_{com}\} \cup \{\mathcal{H}_{chal}\}$ defined as follows: $\mathcal{H}_{id}:\{0,1\}^{\leq \log N + \deg \cdot n \mathcal{H}} \to \{0,1\}^{n\mathcal{H}}$ for every id$\in\{0,1\}^{k_{pos}}$; $\mathcal{H}_{com}:\{0,1\}^{2n}\mathcal{H} \to \{0,1\}^{n\mathcal{H}}$; $\mathcal{H}_{chal}$ takes as input a $\{0,1\}^{k_{pos}+n}\mathcal{H}$-bit string and outputs a random challenge set check plus $\tau_c$ challenge nodes:

$$(\text{check,chal}) := (\text{chal}_1, \ldots, \text{chal}_{\tau_c})) \in V^\tau \times V_c^{(1)} \times \ldots \times V_c^{(\tau_c)}.$$

For simplicity of explanation, we assume that the output length of $\mathcal{H}_{chal}$ is exactly $n\mathcal{H}$ (where $n\mathcal{H} \tau \cdot \log |V| + \tau_c \cdot \log |V_c|$), and we define the corresponding challenge sets (check, chal) as the first $\tau \cdot \log|V| + \tau_c \cdot \log|V_c|$ bits of the RO output. For ease of explanation, we assume that $|V|$ and $|V_c|$ are powers of 2. Note that by a typical domain separation technique (e.g., used in Giuseppe Ateniese et al. (Ateniese et al., 2014) and Mohammad Mahmoody et al. (Mahmoody et al. 2013)), we can instantiate the three random oracles using a unified random oracle $\mathcal{H}:\{0,1\}^* \to \{0,1\}^{n\mathcal{H}}$.

The construction is presented in detail in FIG. 8. We provide a high-level overview here. The prover first computes the labeling of a graph G=(V,E), and then commits the labeling using a Merkle tree. From the merkle root value $\tilde{\phi}_l$, the prover computes the Fiat-Shamir challenge $\mathcal{H}(\tilde{\phi}_l)$, which consists of two sets (check, chal). The set check contains $\tau$ random nodes in V, and the set chal has $\tau_c$ random nodes in a target set $V_c \subseteq V$. The proof is the Merkle tree opening paths for nodes in check$\cup$pred(check)$\cup$chal, where pred(check) are the parents of nodes in check.

In our PExt-NIPoS construction, the honest prover has to store the complete labeling of the graph G plus the entire Merkle tree, thus the size of the prover's space is $$s_P := N \cdot n \mathcal{H} + (N-1) \cdot n \mathcal{H},$$

where $n\mathcal{H}$ is the random oracle output length. On the other hand, the verifier only needs to store a single proof-of-space, which consists of a Merkle root value, two challenge sets, and $\tau \cdot (\deg+1) + \tau_c$ tree paths. Since each tree path is of length log N, the size of the verifier's space is given by:

$$s_V := n \mathcal{H} + \tau \cdot \log N + \tau_c \cdot \log N_c + (\tau \cdot (\deg+1) + \tau_c) \cdot \log N \cdot n \mathcal{H}.$$

It is not hard to see that our PExt-NIPoS scheme satisfies completeness. We formally show that our NIPoS scheme satisfies proof extractability by proving the theorem stated next.

Theorem 1 Let λ be a security parameter. Suppose $G := G_{hard}$ is a $(\beta, N_c, N, \tau_c, t, \varepsilon_{peb})$-challenge hard graph with indegree deg=O(1); $\mathcal{H} : \{0,1\}^* \to \{0,1\}^n \mathcal{H}$ is a hash function modeled as a random oracle; and $\Pi_G$ is a $(\tau_c, \tau, v)$-Merkle-tree-based PExt-NIPoS scheme (defined in FIG. 8) built upon G, where $$v := (\tau \cdot (\deg+1) + \tau_c) \cdot \log N + 1.$$

For any s, f∈ℕ such that there exists a constant δ*∈(0,1) where $$s + f \leq (\beta - \delta^* - 0.01) \cdot N_c \cdot n \mathcal{H},$$

it holds that $\Pi_G$ is a $(k_{pos}, n_{pos}, s_P, s_V)$-NIPoS that is $(s, f, t, \eta, \varepsilon_{p\text{-}ext})$-proof-extractable, $(s, f, t, v, \varepsilon_{p\text{-}ext})$-proof-extractable, as long as $$s_P \geq k_{pos} + (2N-1) \cdot n \mathcal{H} \quad s \geq s_V \geq k_{pos} + v \cdot n \mathcal{H} \quad \eta = O(v \log \lambda)$$

$$n_{pos} = v \cdot n \mathcal{H} \quad \varepsilon_{p\text{-}ext} \leq \text{poly}(\lambda) \cdot (2^{-n \mathcal{H}} + \exp(-\kappa) + \varepsilon_{peb}),$$

where $\kappa = \tau \cdot N_c \cdot \delta^*/N$. The polynomial factor in $\varepsilon_{p\text{-}ext}$ depends on the number of RO queries made by the adversary. We refer to Inequality 9 for the exact probability upper bound.

To guarantee that the verifier space $s_v := v \cdot n \mathcal{H}$ is smaller than the tampering space s, we require $\tau_c$ to be significantly smaller than $N_c/\log N$. Hence the underlying CHG may be at least Ω(log N)-challenge sparse (defined as $N_c/\tau_c$).

If the big adversary B computes the graph labeling and the Merkle commitment herself, that is, the RO input-output pairs in $(\tilde{id}, \tilde{\pi})$ are queried by B, then a knowledge extractor can extract $(\tilde{id}, \tilde{\pi})$ from the query table of B.

Otherwise, we can bound the advantage of the proof extractability game by the advantage of a pebbling challenge game. By challenge-hardness of the graph, the probability that a space-bounded adversary A generates a new proof-of-space in time bound t is negligible.

We consider a restricted storage model where the adversary always stores the graph labels in their entirety before using them, that is, the adversary never compress the graph labels. We leave the proof of Theorem 1 in the general storage model (where the adversary can store arbitrary function of the graph labels) as an interesting open question.

To bound the advantage of proof-extractability game, we first bound the probability of a few bad events. Conditioned on bad events do not happen, it is guaranteed that the space-bounded adversary A wins the game only if it outputs a $(\tilde{id}, \tilde{\pi})$ such that i) the merkle root value $\tilde{\phi}_l \in \tilde{\pi}$ is a commitment of a graph labeling that is mostly consistent with the $\mathcal{H}_{id}$-labeling of graph G, and ii) $\tilde{\pi}$ contains the opening labels of a few random challenge nodes, that is, the challenge nodes set is unpredictable for A. Hence the winning probability can be naturally bounded by the advantage of a labeling challenge game, which in turn can be transformed to a pebbling challenge game. And thus we can bound the advantage of proof-extractability game by the advantage of pebbling challenge game, which finishes the proof.

D. Instantiating CHG

First note that a family of SoLEG (with constant in-degree) is already challenge hard if the number of challenge nodes (i.e., $\tau_c$) satisfies that $\tau_c > (\beta + \gamma_1) \cdot N_c$. However, the challenge sparseness of the graph (i.e., $N_c/\tau_c$) is O(1) which too small for our application. We need a challenge-hard graph with Ω(log N)-challenge sparseness. We resolve this by constructing challenge-hard graphs with larger challenge sparseness by extending a family of SoLEGs. For ease of explanation, in the following we assume that $N_c$ is divisible by $\tau_c$. We note that a similar result holds if $N_c/\tau_c$ is not an integer.

FIG. 8 shows an example construction and verification of a NIPoS based on a labeling of a challenge-hard graph according to embodiments. The construction may be done by an encoding device (e.g., a provisioning device) and the verification may be done by a decoding device (e.g., a mobile device).

At block 810 the proof can be setup by the encoding device using algorithm Setup $\mathcal{H}$ ($1^\lambda$). The setup algorithm 810 can take as input a security parameter λ in form of $1^\lambda$. It then outputs public parameters $pp_{pos}$. $\tau_c$ is the number of challenge nodes. N is the size of the graph. $N_c$ is the size of the target set, and the challenge set is all of the challenges.

At block 820 the proof can be computed by the encoding device using proof algorithm $P_{PP} \mathcal{H}$ (id). The proof algorithm consists of a number of substeps.

At block 821, the labeling l of the graph can be computed by the encoding device.

At block 822, given the labeling l of the graph G, the encoding device can compute a Merkle commitment. The Merkle commitment may be a hash of the labeling l. In computing the Merkle commitment, the encoding device may compute a Merkle root.

At block 823, the encoding device can determine the set of challenges using the secret id and the Merkle root $\phi_l$. The set of challenges may be a set of nodes that will be used to verify the labeling l.

At block 824, the encoding device can compute and output the proof π. The proof π may comprise the Merkle-root (i.e., the hash of the labeling l) and the two challenge sets (a check set check and a challenge set chal). A second component of the proof π can comprise the Merkle-tree opening paths for nodes that are in the union of the check set, in the predecessors of the check set, and the challenge set.

At block 830, given public parameters $pp_{pos}$, identity $id \in \{0,1\}^{k_{pos}}$ and a candidate proof-of-space $\pi \in \{0,1\}^{n_{pos}}$, the decoding device can check the correctness of π with respect to id as follows:

At block 831, the decoding device can parse the proof π. In parsing the proof π, the decoding device can identify parts of the proof π, such as the Merkle root $\phi_l$, the check set check and the challenge set chal, and the Merkle-tree opening paths for nodes that are in the union of the check set, in the predecessors of the check set, and the challenge set.

At block 832, the decoding device can check the challenge check set. (check, chal) may contain a set of indexes of nodes that are to be checked. The set of indexes may be generated by applying the hash function to $\phi_l$. This set may be checked to ensure that an attacker cannot change the set to falsify a result.

At block 833, the decoding device can check the hash of each node in the check set against the hash of its parents. The decoding device can check the hashes by determining if the hash of each node is equal to the hash of its parents.

At block 834, the decoding device can check all of the nodes in the check set, the parents of the check set, and the challenge set to verify that the labels have been computed correctly.

At block 835, the decoding device can output a '1' if and only if all of the checks pass, indicating that the correctness is verified, otherwise it can output a '0'.

1. SoLEG-Based Construction

Some embodiments use a SoLEG based construction. Given $N_c, \tau_c \in \mathbb{N}$ (where $N_c/\tau_c$ is an integer), the challenge-hard graph $G_{hard}$ is a $\tau_c$-extension of a SoLEG. It consists of a SoLEG, $\tau_c$ gadget graphs, and edges from SoLEG's sink vertices to the gadget graphs.

For every i ($1 \leq i \leq \tau_c$), the ith gadget graph $H_{N_c}^{(i)} = (V^{(i)}, E^{(i)})$ consists of $N_c/\tau_c$ lines. For every j ($1 \leq j \leq N_c/\tau_c$), the jth line $\text{line}_j^{(i)}$ (in $H_{N_c}^{(i)}$) consists of $N_c/\tau_c$ vertices and a path from the first vertex to the last vertex. For every j ($1 \leq j \leq N_c/\tau_c$), we denote by $\text{end}_j^{(i)}$ the sink of $\text{line}_j^{(i)}$, the ith target set $V_c^{(i)}$ is then defined to be $$V_c^{(i)} := \text{end}_1^{(i)} \cup \ldots \cup \text{end}_{N_c/\tau_c}^{(i)}.$$

And we see that the union of the target sets $$V_c := V_c^{(1)} \cup \ldots \cup V_c^{(\tau_c)}$$

contains $N_c$ vertices.

Besides the edges in the SoLEG and gadget graphs, there are also edges from SoLEG's sink vertices to the gadget graphs. In particular, for every i ($1 \leq i \leq \tau_c$) and every k ($1 \leq k \leq N_c/\tau_c$), the $((i-1)N_c/\tau_c + k)$-th sink vertex of the SoLEG has $N_c/\tau_c$ outgoing edges to the gadget graph $H_{N_c}^{(i)}$, where the jth ($1 \leq j \leq N_c/\tau_c$) outgoing edge points to the kth vertex of the jth line $\text{line}_j^{(i)}$).

Let $G_{N_c,k_G,\gamma_1,\gamma_2}$ be the SoLEG, the number of vertices in $G_{hard}$ is $$N := k_G \cdot N_c + \tau_c \cdot \left(\frac{N_c}{\tau_c}\right)^2 = k_G \cdot N_c + \frac{N_c^2}{\tau_c}.$$

It is easy to observe that the challenge sparseness is $N_c/\tau_c$ and the graph compactness of the graph is $k_G + N_c/\tau_c$ for the above construction. We prove the following lemma about our construction.

Lemma 6 Let $G_{N_c,k_G,\gamma_1,\gamma_2}$ be a SoLEG with parameters $N_c$, $k_G \in \mathbb{N}$, $\gamma_1, \gamma_2 \in (0,1)$. Denote by $\beta := \gamma_2 - 2\gamma_1 > 0$ and $\varepsilon := 1 - \beta - \gamma_1 > 0$. For any $\tau_c \in \mathbb{N}$ (such that $N_c/\tau_c$ is an integer), let $G_{hard} := (V,E)$ be the $\tau_c$-extension of $G_{N_c,k_G,\gamma_1,\gamma_2}$. Then it holds that $G_{hard}$ is ($\beta$, $N_c, N := k_G \cdot N_c + N_c^2/\tau_c$, $\tau_c$, $2^{k_G} \cdot \gamma_1 \cdot N_c$, $\exp(-\varepsilon^2 \cdot \tau_c)$)-challenge hard.

Proof. Fix any adversary $B=(B_1, B_2)$ and consider the pebbling challenge game $G_{B,\beta,t,\tau_c,G}^{peb}(\lambda)$. Denote by $P_0 \subseteq V$ the initial pebbled set output by $B_1$. Denote by $n_0 := \delta_0 \cdot N_c$ the number of output vertices (in $G_{N_c,k_G,\gamma_1,\gamma_2}$) that were initially pebbled. For every i ($1 \leq i \leq \tau_c$), recall that the target subset $V_c^{(i)}$ consists of $N_c/\tau_c$ lines, and we denote by $n_i := \delta_i \cdot N_c/\tau_c$ the number of lines that have at least one pebble on it (i.e., the lines whose intersection with $P_0$ are non-empty). Since $|P_0| \leq \beta \cdot N_c$, by definition of the game, we have $$|P_0| \leq \sum_{i=0}^{\tau_c} n_i = \delta_0 \cdot N_c + \sum_{i=1}^{\tau_c} \delta_i \cdot \frac{N_c}{\tau_c} \leq \beta \cdot N_c.$$

By rewriting the second inequality, we have $$\sum_{i=1}^{\tau_c} \delta_i \cdot \frac{N_c}{\tau_c} \leq (\beta - \delta_0) \cdot N_c. \tag{1}$$

For every i ($1 \leq i \leq \tau_c$), we define a random variable $X_i \in \{0, 1\}$ for the ith challenge node: Denote by $\text{chal}_i \subseteq V_c^{(i)}$ the challenge node in the ith target set $V_c^{(i)}$; we set $X_i := 1$ if the line that contains $\text{chal}_i$ has no initially pebbled vertex (i.e., the line has no intersection with $P_0$); and we set $X_i := 0$ otherwise. We define $$X := \sum_{i=1}^{\tau_c} X_i.$$

Note $\Pr[X_i = 1] = 1 - \delta_i$ (over the randomness of $\text{chal}_i$), and random variables $\{X_i\}_{i \in [\tau_c]}$ are independent. Recall that $\varepsilon := 1 - \beta - \gamma_1 > 0$, thus by Hoeffding inequality, we have $$\Pr[X \leq \mathbb{E}[X] - \varepsilon \cdot \tau_c] \leq \exp(-2 \cdot \varepsilon^2 \cdot \tau_c).$$

Next we show that if $X \geq \mathbb{E}[X] - \varepsilon \cdot \tau_c$, then it takes at least $t := 2^{k_G} \cdot \gamma_1 \cdot N_c$ steps to pebble all the challenge vertices, and hence finish the proof.

Claim 1 Denote by $\varepsilon := 1 - \beta - \gamma_1 > 0$. If the challenge set chal is chosen so that $$X \geq \mathbb{E}[X] - \varepsilon \cdot \tau_c = \sum_{i=1}^{\tau_c}(1 - \delta_i) - (1 - \beta - \gamma_1) \cdot \tau_c = (\beta + \gamma_1) \cdot \tau_c - \sum_{i=1}^{\tau_c} \delta_i,$$

then it takes the adversary $B_2$ at least $t := 2^{k_G} \cdot \gamma_1 \cdot N_c$ steps to pebble all the challenge vertices.

Proof. First, we show that the adversary $B_2$ has to pebble at least $X \cdot N_c/\tau_c$ output vertices (in $G_{N_c,k_G,\gamma_1,\gamma_2}$) to answer all challenges: For every i ($1 \leq i \leq \tau_c$), if $X_i = 1$, then the line that contains $\text{chal}_i$ has no initially pebbled vertex. Thus to pebble the sink node $\text{chal}_i$, the adversary has to pebble the vertices (on the line) step by step, which in turn requires the pebbling of the output vertices $[(i-1) \cdot N_c/\tau_c + 1, \ldots, i \cdot N_c/\tau_c]$ of $G_{N_c,k_G,\gamma_1,\gamma_2}$. Since $X = \sum_{i=1}^{\tau_c} X_i$, the adversary has to pebble at least $X \cdot N_c/\tau_c$ output vertices in total.

Proof. Fix any adversary $B=(B_1, B_2)$ and consider the pebbling challenge game $G_{B,\beta,t,\tau_c,G}^{peb}(\lambda)$. Denote by $P_0 \subseteq V$ the initial pebbled set output by $B_1$. Denote by $n_0 := \delta_0 \cdot N_c$ the number of output vertices (in $G_{N_c,k_G,\gamma_1,\gamma_2}$) that were initially pebbled. For every i ($1 \leq i \leq \tau_c$), recall that the target subset $V_c^{(i)}$ consists of $N_c/\tau_c$ lines, and we denote by $n_i := \delta_i \cdot N_c/\tau_c$ the number of lines that have at least one pebble on it (i.e., the lines whose intersection with $P_0$ are non-empty). Since $|P_0| \leq \beta \cdot N_c$, by definition of the game, we have $$|P_0| \leq \sum_{i=0}^{\tau_c} n_i = \delta_0 \cdot N_c + \sum_{i=1}^{\tau_c} \delta_i \cdot \frac{N_c}{\tau_c} \leq \beta \cdot N_c.$$

By rewriting the second inequality, we have $$\sum_{i=1}^{\tau_c} \delta_i \cdot \frac{N_c}{\tau_c} \leq (\beta - \delta_0) \cdot N_c. \tag{2}$$

For every i ($1 \leq i \leq \tau_c$), we define a random variable $X_i \in \{0, 1\}$ for the ith challenge node: Denote by $\text{chal}_i \subseteq K_c^{(i)}$ the challenge node in the ith target set $K_c^{(i)}$; we set $X_i := 1$ if the line that contains $\text{chal}_i$ has no initially pebbled vertex (i.e., the line has no intersection with $P_0$); and we set $X_i := 0$ otherwise. We define $$X := \sum_{i=1}^{\tau_c} X_i.$$

Note $\Pr[X_i = 1] = 1 - \delta_i$ (over the randomness of $\text{chal}_i$), and random variables $\{X_i\}_{i \in [\tau_c]}$ are independent. Recall that $\varepsilon := 1 - \beta - \gamma_1 > 0$, thus by Hoeffding inequality, we have $$\Pr[X \leq \mathbb{E}[X] - \varepsilon \cdot \tau_c] \leq \exp(-2 \cdot \varepsilon^2 \cdot \tau_c).$$

Next we show that if $X \geq \mathbb{E}[X] - \varepsilon \cdot \tau_c$, then it takes at least $t := 2^{k_G} \cdot \gamma_1 \cdot N_c$ steps to pebble all the challenge vertices, and hence finish the proof.

Claim 2 Denote by $\varepsilon := 1 - \beta - \gamma_1 > 0$. If the challenge set chal is chosen so that $$X \geq \mathbb{E}[X] - \varepsilon \cdot \tau_c = \sum_{i=1}^{\tau_c}(1-\delta_i) - (1-\beta-\gamma_1) \cdot \tau_c = (\beta+\gamma_1) \cdot \tau_c - \sum_{i=1}^{\tau_c}\delta_i,$$

then it takes the adversary $B_2$ at least $t:=2^{k_G}\cdot\gamma_1\cdot N_c$ steps to pebble all the challenge vertices.

Proof. First, we show that the adversary $B_2$ has to pebble at least $X\cdot N_c/\tau_c$ output vertices (in $G_{N_c,k_G,\gamma_1,\gamma_2}$) to answer all challenges: For every i ($1\leq i\leq\tau_c$), if $X_i=1$, then the line that contains chap has no initially pebbled vertex. Thus to pebble the sink node chap, the adversary has to pebble the vertices (on the line) step by step, which in turn requires the pebbling of the output vertices $[(i-1)\cdot N_c/\tau_c+1, \ldots, i\cdot N_c/\tau_c]$ of $G_{N_c,k_G,\gamma_1,\gamma_2}$. Since $X=\Sigma_{i=1}^{\tau_c}X_i$, the adversary has to pebble at least $X\cdot N_c/\tau_c$ output vertices in total.

Combining the above arguments, with probability at least $1-\exp(-2-\varepsilon^2\cdot\tau_c)$ (over the choice of the challenge set), it takes at least $t:=2^{k_G}\cdot\gamma_1\cdot N_c$ steps to pebble all the challenge vertices, and thus the graph $G_{hard}$ is $(\beta,N,\tau_c,2^{k_G}\cdot\gamma_1\cdot N_c,\exp(-\varepsilon^2\cdot\tau_c))$-challenge hard.

2. Construction of CHG from PTC's Graphs

As observed by Stefan Dziembowski et al., (Dziembowski et al., 2015), the graph introduced by Paul, Tarjan and Celoni (Paul et al., 1976), in short, PTC's graph, does satisfy challenge hardness. Adapting Theorem 1 of Stefan Dziembowski et al. (Dziembowski et al., 2015), into the multiple challenge setting, we obtain the following lemma.

Lemma 7 Let $\{G\}_{\lambda\in\mathbb{N}}$ be a family of PTC's graph (DAG) with graph parameters $N_c=N_c(\lambda)$. $N:=N_c\log N_c$ and in-degree 2. Then for any $\tau_c\in\mathbb{N}$ and any $\lambda\in\mathbb{N}$, $G_\lambda$ is $(\beta,N_c,N,\tau_c,\infty,(1-\beta)^{\tau_c})$-challenge-hard where $\beta=1/512$.

E. Comparison of CHG Constructions

Two challenge-hard graph constructions, SoLEG-based and PTC's graph-based, can be compared. By setting $\varepsilon=2^{-80}$, the pebbling budget $\beta\cdot N_c:=2^{10}$, and time bound to be $2^{80}$, we calculate the concrete values of the other parameters.

Corollary 1 (CHG based on SoLEGs (concrete)). For the SoLEG-extension, to obtain 80-bit security in the pebbling game (i.e., $\text{Adv}_{B,\beta,t,\tau_c,G}^{peb}(\lambda)\leq 2^{-80}$), the challenge parameter $\tau_c$ can be approximated to $2^8$. For the pebbling budget bound $\beta\cdot N_c:=2^{10}$ and a typical time bound $t:=2^{80}$, the target set size $N_c$ is no more than $2^{12}$, and the graph size N is about $2^{18}$.

Corollary 2 (CHG based on-PTC's graphs (concrete)). For the PTC's graph, for a typical 80-bit security of the pebbling game (i.e., $\text{Adv}_{B,\beta,t,\tau_c,G}^{peb}(\lambda)\leq 2^{-80}$), the challenge parameter $\tau_c$ can be approximated to $\approx 2^{15}$. For a typical pebbling budget $\beta\cdot N_c:=2^{10}$, we have to set the target set size $N_c$ to be $2^{19}$, and the graph size should be at least $N:=2^{23}$.

Some instantiations of PExt-NIPoS from CHGs can be discussed.

Corollary 3 (PExt-NIPoS from SoLEG-ext. (concrete)). Let us fix [We set the bound for $\varepsilon_{p\text{-}ext}$ to be $2^{-160}$]

$|Q\mathcal{H}_{(B)}|2^{64}|Q\mathcal{H}_{(A)}|\leq 2^{64}n\;\mathcal{H}=2^{16}t=2^{80}\varepsilon_{p\text{-}ext}=2^{-160}$, and consider the NIPoS built upon SoLEG-based CHGs. To guarantee that $s_V\leq s$, the graph size of the SoLEG-based CHG is at least N≠ 100,000,000. The resulting NIPoS is a ($k_{pos}$, $n_{pos}$,$s_P$,$s_V$)-NIPoS that is (s,f,t,$\eta$,$\varepsilon_{p\text{-}ext}$)-proof extractable, where (s,f,t,v≈12 KB, $\varepsilon_{p\text{-}ext}$)-proof extractable, where $k_{pos}\approx 1$ MB$n_{pos}$,$s_V\approx 800$ MB$s_P\approx 1$ TB$s+f\approx 1.1$ GB$\eta\approx 750$ KB.

$k_{pos}\approx 800$ MB$n_{pos}=s_V\approx 800$ MB$s_P\approx 1$ TB$s+f\approx 1.1$ GB.

Corollary 4 (PExt-NIPoS from PTC (concrete)) Let us fix:

$|Q\mathcal{H}_{(B)}|2^{64}|Q\mathcal{H}_{(A)}|\leq 2^{64}n\;\mathcal{H}=2^{16}t=2^{80}\varepsilon_{p\text{-}ext}=2^{-160}$, and consider the NIPoS built upon CHGs in Wolfgang J Paul et al. (Paul et al., 1976). To guarantee that $s_V\leq s$, the graph size of the CHG is at least N≠ 300,000,000,000. The resulting NIPoS is a ($k_{pos}$,$n_{pos}$,$s_P$,$s_V$)-NIPoS that is (s,f,t,$\eta$,$\varepsilon_{p\text{-}ext}$)-proof extractable, where (s,f,t,v≈4 MB, $\varepsilon_{p\text{-}ext}$)-proof extractable, where $k_{pos}\approx 256$ MB$n_{pos}$,$s_V\approx 256$ GB$s_P\approx 2.5$ PB$s+f\approx 256$ GB$\eta\approx 250$ MB.

$k_{pos}\approx 256$ GB$n_{pos}=s_V\approx 256$ GB$s_P\approx 2.5$ PB$s+f\approx 256$ GB.

Let us first give some intuition. Since the no (s,f,t)-bounded adversary can compute the function M on a random input $\mathcal{H}$ (id), B's best bet to make the output of the $G_{B,id}^{ext}(\lambda)=1$ is to either (i) compute another function, that is not memory-hard and "fake" the proof or (ii) guess the random-oracle output $\mathcal{H}$ (id) correctly. The probabilities are bounded by $\varepsilon_{vc}$ and $\approx 1/2^k$ respectively for those events and hence the probability of $G_{B,id}^{ext}(\lambda)$ outputting 1 can be bounded by $\approx\varepsilon_{vc}+2^{-k}$.

IV. CONSTRUCTING PEXT-NIPOS FROM MEMORY-HARD FUNCTIONS

In order to achieve reasonable security, the concrete parameters of these constructions may become impractical in some embodiments. For example, for a message of size 1 MB, the size of a codeword is almost 800 MB for the CHG-based NMC constructions (see Table 3). To complement this, we propose a simple and practical instantiation of NIPoS based on heuristic assumptions. The construction uses a concrete instantiation of a memory-hard-function (MHF), and applies a (non-interactive) publicly verifiable computation where the verification requires small space. When the MHF is instantiated with the SoLEG-based construction of Ren and Devadas (Ren and Devadas, 2016), the resulting NIPoS has extractability and a "good measure of uniqueness". This yields a PExt-NIPoS with very good parameters and, consequently, plugging-in that to the encoding scheme of Faust et al. (Faut et al., 2017a) we obtain a CSNMC with very small proof size (in kilobytes), that also allows a leakage, as small as p–0.99|c|, in certain settings.

While the above scheme is practical, it is not provably secure. Instead, we rely on heuristic assumptions that intuitively state that the MHF remains memory-hard when the random oracle is instantiated with a standard hash function like SHA3.

In this section we propose a simple construction of NIPoS with extractability. Our construction is based on memory—hard functions (MHF for short) and verifiable computations. Intuitively, an MHF requires that any time-bounded algorithm needs to use significant memory to compute such function on a randomly chosen input. We remark that we treat the hash functions inside the MHF as concrete hash functions and not modeled as random oracles. In particular, we require that an MHF is concretely described and can be represented as a circuit. This is crucial in our context as we use verifiable computation which requires non-black-box access to the function (i.e. an MHF) to be verified. Indeed, we pay a price for that. We do not have a provable guarantee for the memory-hardness, because the only known way to have such guarantee is to use ROM (that gives provable guarantees based on pebbling-games) which is not compatible with our setting. Instead, we heuristically assume that a hash-based MHF construction, that has provable memory-hardness guarantee in the ROM, is memory-hard when the random oracle is instantiated with a standard hash function (for example SHA3).

Definition 15 (Memory-hard Functions (MHF)) Let $\mathcal{H}:\{0,1\}^* \to \{0,1\}^k$ be a random oracle. For parameters $k, n, s_{mhf}, t_{mhf}, s, f, t \in \mathbb{N}$ and $\varepsilon_{mhf} \in [0,1)$, where $s_{mhf} \geq s$, a function $M:\{0,1\}^k \to \{0,1\}^n$ is called a $(k, n, s_{mhf}, t_{mhf}, s, f, t, \varepsilon_{mhf})$-memory-hard function (or MHF for short) in the ROM if:

M is computable by a $(s_{mhf}, t_{mhf})$-space-time-bounded algorithm.

For any (s,f,t)-bounded deterministic algorithm A $\mathcal{H}$, any $x \in \{0,1\}^*$ we have that:

$$\Pr_{\mathcal{H}}[M(\mathcal{H}(x)) = A^{\mathcal{H}}(x)] \leq \varepsilon_{mhf}$$

A. Partially-Unique Ext-NIPoS from MHF and VC.

In this section, we construct a partially-unique NIPoS with extractability based on a MHF and a VC with space-bounded verification. At a high level, the NIPoS scheme is designed as follows. Let M be a memory-hard function and (Gen, Prove, Ver) a publicly verifiable scheme. The NIPoS prover on input id first queries the random oracle to obtain $x := \mathcal{H}$ (id) and then runs the algorithm Prove on input x and outputs whatever the algorithm outputs, i.e. the value $y := M(x)$ and the proof of correct computation $\pi_{vc}$. The NIPoS verifier on input id and the proof of space $(y, \pi_{vc})$ first queries the random oracle to obtain $x := \mathcal{H}$ (id) and the runs the algorithm Ver on input x, y, m and outputs whatever the algorithm outputs.

For a construction, according to embodiments, let M be a $(k, n, s_{mhf}, t_{mhf}, s, f, t, \varepsilon_{mhf})$-MHF, (Gen,Prove,Ver) be a $(s_{mhf}, t_{mhf}, s_P^{vc}, t_P^{vc}, s_V^{vc}, t_V^{vc}, n, n_{vc}, \varepsilon_{vc})$-VC scheme for M and $\mathcal{H}:\{0,1\}^* \to \{0,1\}^k$ be a hash-function modeled as random oracle such that $t_{mhf}, t_P^{vc}, t_V^{vc} \in \text{poly}(\lambda)$ and $s_V^{vc} \leq s < s_P^{vc}$. Then define the following algorithms:

Setup($1^\lambda$): On input the security parameter, run $(vk_M, ek_M) \to \text{Gen}_M(1^\lambda)$ and set $pp_{pos} := (vk_M, ek_M)$.

$P_{PP} \mathcal{H}$ (id): Given public parameters $pp_{pos} := (vk_M, ek_M)$ and an identity $\text{id} \in \{0,1\}^{k_{pos}}$, compute the proof-of-space as follows:
(a) Obtain $x := \mathcal{H}$ (id) by querying $\mathcal{H}$.
(b) Compute $(y, \pi_{vc}) := \text{Prove}_{ek_M}(x)$.
(c) Return $\pi := (y, m_{vc})$.

$V_{PP} \mathcal{H}$ (id,$\pi$): Given public parameters $pp_{pos} := (vk_M, ek_M)$ an identity $\text{id} \in \{0,1\}^{k_{pos}}$ and a candidate proof $\pi \in \{0,1\}^{n_{pos}}$, check the correctness of $\pi$ with respect to id as follows:
(a) Obtain $x := \mathcal{H}$ (id) by querying $\mathcal{H}$.
(b) Parse $(y, \pi_{vc}) := \pi$.
(c) Return $\text{Ver}_{vk_M}(x, y, \pi_{vc})$.

B. Instantiating MHF

On input $x \in \{0,1\}^k$, define the MHF $M_{G,Hash}$ as follows: consider the SoLEG $G_{N_c, k_G, \gamma_1, \gamma_2}$; recall that the number of nodes of $G_{N_c, k_G, \gamma_1, \gamma_2}$ is given by $N = N_c(k_G+1)$ and the in-degree is $\deg \in O(1)$. Let Hash:$\{0,1\}^* \to \{0,1\}^{n_{hs}}$ be a standard hash function (for example SHA3) with collision-probability $\varepsilon_{hs}$. On input $x \in \{0,1\}^k$, first compute a Hash, labeling of $G_{N_c, k_G, \gamma_1, \gamma_2}$. Denote the labeling by $z = (z_1, \ldots, z_N) \in \{0,1\}^{n_{hs} N}$, where each $z_i \in \{0,1\}^{n_{hs}}$. Output y where $y := \mathcal{H}_x(z) \in \{0,1\}^{n_{hs}}$.

For the hash function Hash:$\{0,1\}^* \to \{0,1\}^{n_{hs}}$ and for our construction based on a SoLEG $G_{N_c, k_G, \gamma_1, \gamma_2}$ with $N = N_c(k_G+1)$ nodes and $\deg = O(1)$ in-degree:

$$n_{hs} = \lambda^2 \beta - \gamma_2 - 2\gamma_1 \in (0,1) \quad k_G = \lambda - 1$$

$$N_c = \lambda^3 \varepsilon_{hs} \in \text{negl}(\lambda).$$

Then, for any $\delta \in (0, \beta)$, any $\varepsilon > 0$ and any $\gamma_{hs} \in (0, \frac{1}{2}]$ our construction is a $(k, n, s_{mhf}, t_{mhf}, s, f, t, \varepsilon_{mhf})$-MHF for t,f, $t_{mhf} \in \text{poly}(\lambda)$ and:

$$k = O(\lambda^\varepsilon) \quad n = \lambda^2 \quad s_{mhf} = O(\lambda^5)$$

$$s \leq \delta \cdot \lambda^5 \quad \varepsilon_{mhf} \leq \exp\left(\frac{-(\beta - \delta)\lambda}{\log(\lambda)}\right) + \text{negl}(\lambda) \in \text{negl}(\lambda)$$

Furthermore, for making $\varepsilon_{mhf} \approx 2^{-80}$, we need to have $\lambda \approx 2300$. Choosing standard values for other parameters, $\delta = 0.1$, $\beta = 0.9$, $\gamma_{hs} = 0.001$ we get concrete parameters for our MHF-construction as:

$$k \geq 80 \quad n \approx 670 \text{ KB} \quad s_{mhf} \approx 8000 \text{ TB} \quad s \leq 800 \text{ TB} \quad \varepsilon_{mhf} \approx 2^{-80}$$

C. Instantiating VC

Our NIPoS construction can be instantiated with any VC for which the verification can be done in small space (compared to computing the function itself). Some embodiments make use of a scheme, known as Pinocchio (Parno et al., 2013).

Without giving formal arguments on the space-bound, we rely on the following assumption on the Pinocchio verification algorithm. Note that these bounds are independent of the space-bound of the function (in this case that is $M_{G,Hash}$) to be verified.

Assumption 3 (Space-bounded Verification). Let G be a (as considered in Bryan Parno et al. (Parno et al., 2013)) cyclic subgroup of points in $E(\mathbb{F}_p)$; $E(\mathbb{F}_p)$ denotes an elliptic curve over $\mathbb{F}_p$ where $p \in \exp(\Delta)$ is a prime. To achieve 128-bits of security, as suggested by Aurore Guillevic and François Morain (Guillevic and Morain), we will set $\lceil \log(p) \rceil \approx 1536$. Then for a function $F:\{0,1\}^k \to \{0,1\}^n$, the Pinocchio verification algorithm (see Protocol 2 of Bryan Parno et al. (Parno et al., 2013)) requires $k+n+O(\lambda)$-bit space asymptotically and $\approx k+n+300 \cdot \lceil \log p \rceil$ bits concretely.

First notice that the size of the proof is equal to 8 elements of a group $\mathbb{G}$. Hence, the size of the proof is upper bounded by $16 \cdot \lceil \log(p) \rceil$. The verifier has the verification key $vk_F$ hardcoded and it gets as input (i) the input and output values of the function F, i.e. k+n bits in total, and (ii) a proof of correct computation, $\pi_{vc}$ which consists of 8 group elements. Thus, on high level, the verifier needs to store the input and output, has to be able to further store constant number of group elements, have enough space to add two points on the curve and compute a non-trivial bilinear map e: $\mathbb{G} \times \mathbb{G}' \to \mathbb{G}_T$ (Boneh and Franklin, 2001) where $\mathbb{G}'$ is subgroup of $E(\mathbb{F}_{p^2})$ and the target group $\mathbb{G}_T$ is a subgroup of $\mathbb{F}_{p^2}^*$.

A point on an elliptic curve can be stored using constantly many field elements. Addition of two curve points requires only constantly more space than performing an arithmetic operation in the field for which we need $O(\log(p))$ space. Computing the bilinear map requires constantly more space than adding two curve points. Thus, asymptotically, the space complexity of the verifier can be assumed to be $k+n+O(\log(p)) = k+n+O(\lambda)$. It is more challenging to have a reasonable measurement of the concrete space complexity of the verifier since it depends not only on the concrete implementation of the verification algorithm itself but also on the concrete implementation of all its subprotocols including the basic arithmetic operations in the finite field $\mathbb{F}_p$. Assuming that Ver is implemented in a sequential manner, e is the modified Weil pairing as defined in Dan Boneh and Matthew K. Franklin (Boneh and Franklin, 2001)

computed using Miller's algorithm (Miller, 1986), we can roughly assume the space complexity of the verifier as $s_V^{vc} \leq k+n+300 \cdot \lceil \log(p) \rceil$.

The space requirement of the prover algorithm $\text{Prove}_{ek_F}$ (with hardcoded evaluation-key $ek_F$) mainly depends on the space-complexity of the function F to be verified. Suppose that F can be computed by a $(s_F, t_F)$-bounded algorithm, then the space requirement of $\text{Prove}_{ek_F}$ must be at least $\max(s_F, n_{vc})$ because the prover also outputs the proof of computation of length $n_{vc}$. For Pinocchio, $n_{vc}$ is equal to $16 \lceil \log p \rceil$. But since we are concerned with memory-hard functions, we simply assume that $s_F \gg n_{vc}$. However, in reality it could be much larger than that as the prover has to (i) evaluate the circuit (ii) interpolate a polynomial of degree d, that is upper bounded by the number of gates in the circuit (more precisely, it is equal to the number of multiplication gates in the circuit) (iii) divide two polynomials of degree d (iv) finish the computation of the proof (that consists of 8 group elements of size $\lceil \log p \rceil$) by scalar multiplications and additions of points on elliptic curve (for more details we refer to Bryan Parno et al.).

Corollary 5. Let $\lambda \in \mathbb{N}$ be the security parameter and let $F: \{0,1\}^k \to \{0,1\}^n$ be a deterministic function that is computable by an $(s_F, \text{poly}(\lambda))$-space-time bounded algorithm. Then there exists an explicit $(s_F, \text{poly}(\lambda), s_V^{vc}, \text{poly}(\lambda), s_P^{vc}, \text{poly}(\lambda), k, n, n_{vc}, \text{negl}(\lambda))$-non-interactive publicly verifiable computation construction, where:

$$s_V^{vc} = k+n+O(\lambda) s_P^{vc} \geq s_F n_{vc} = O(\lambda)$$

Furthermore, in concrete terms, to get $\varepsilon_{vc} \approx 2^{-128}$, choosing $\lceil \log p \rceil \approx 1536$ (following Aurore Guillevic and Francois Morain (Guillevic and Morain) we can have estimations of the verifier's space $s_V^{vc}$ 58 KB+k+n and the proof-size $n_{vc} \approx 3$ KB.

D. Instantiating Partially Unique NIPoS and PExt-NIPoS

Putting together the instantiations of MHF and VC, we can get a (partially) unique extractable NIPoS.

Corollary 6 (MHF-based NIPoS with uniqueness). For any $\varepsilon > 0$ and a $\delta \in (0,1)$ there is an explicit construction of $(k_{pos}, n_{pos}, s_P, s_V)$-NIPoS which has $(u_{pos}, \varepsilon_{unique})$-uniqueness and $(s, f, t, \eta, \varepsilon_{pos})$-extractability for any $f, t \in \text{poly}(\lambda)$ as long as:

$$k_{pos} \in \text{poly}(\lambda^\varepsilon) \; n_{pos} = O(\lambda^2) \; s_P = \Omega(\lambda^5) \; s \leq \delta \lambda^5$$

$$S_V = O(\lambda^2) \; u_{pos} = \lambda^2 \; \varepsilon_{unique} \in \text{negl}(\lambda) \; \eta = O(\log(\lambda))$$
$$\varepsilon_{pos} \in \text{negl}(\lambda).$$

Instantiating this construction with $\lambda = 2300$ to get $\varepsilon_{pos} \approx 2^{-80}$, and setting $k_{pos} = 4$ KB, $|Q\mathcal{H}(B)| \leq 2^{64}$ and $\delta = 0.1$, we obtain a $(k_{pos}, n_{pos}, s_P, s_V)$-NIPoS which has $(u_{pos}, \varepsilon_{unique})$-uniqueness and $(s, f, t, \eta, \varepsilon_{pos})$-extractability where f, t can be set to any large enough value and $$k_{pos} = 4 \text{ KB } n_{pos} \approx 673 \text{ KB } s_P \geq 8000 \text{ TB } s \leq 800 \text{ TB}$$

$$s_V \approx 740 \text{ KB } u_{pos} \approx 670 \text{ KB } \varepsilon_{unique} \approx 2^{-128} \; \eta = 64 \; \varepsilon_{pos} \approx 2^{-80}.$$

VI. MEMORY CONSTRAINTS

Figure 9A:
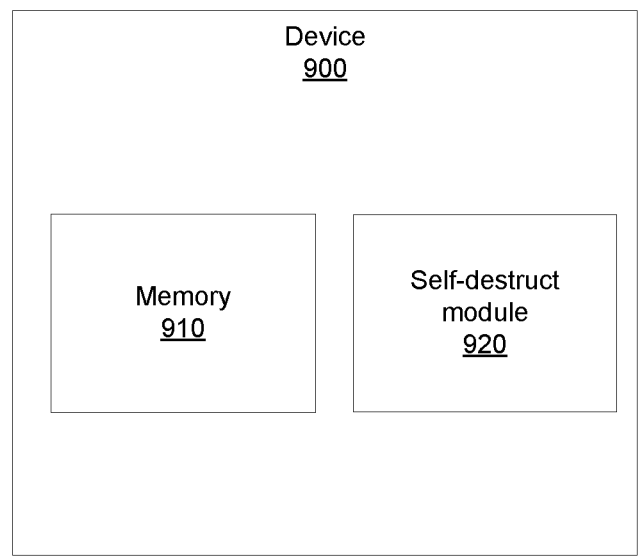
FIG. 9A shows a device according to embodiments.

FIG. 9A depicts a device 900 comprising a memory 910 and a self-destruct module 920. The device 900 may be, for example, a mobile device. The memory 910 may be memory of a secure element (not pictured), and may thus be referred to as secure memory. The memory 910 may be limited in size, e.g., on the order of megabytes. In some embodiments, the memory 910 may be larger and store a larger codeword. The codeword may be stored in secure memory. In embodiments, the size of the codeword may be on the order of the size of the memory 910. The self-destruct module 920 may enact a "self-destruct" mechanism once tampering is detected on the device. As an example, the self-destruct mechanism can cause the device 900 (e.g., a secure element) to erase its entire state (or make it non-functional). In particular, the secure element may flip a control bit from 0 to 1 when tampering is detected. The secure element may become inoperable when the control bit is set to 1, preventing the secure element from performing further decoding or cryptographic functions.

Figure 9B:
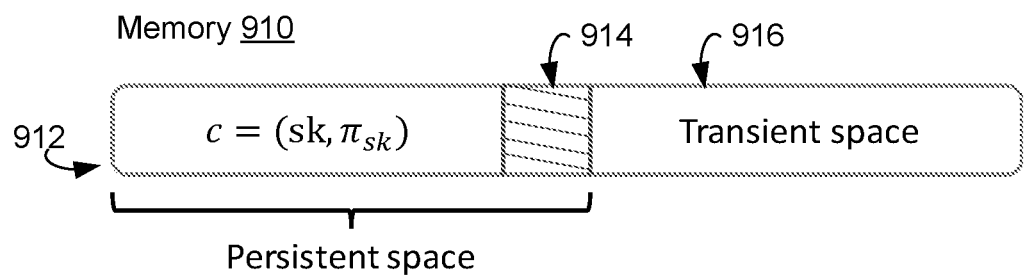
FIG. 9B shows a memory of the device according to embodiments.

FIG. 9B further depicts the memory 910. The memory 910 may comprise a persistent space 912 that is retained over time and a transient space 916 that is refreshed periodically (e.g., after each decoding). The persistent space 912 may store a codeword c comprising a secret sk (e.g., a cryptographic key) and a proof $\lambda_{sk}$ based on the secret sk. The codeword c may use most of the persistent space 912, but there may be some space unused that makes up an extra-persistent space 914. In embodiments, the size of the extra-persistent space 914 may be set to 64 bits.

VII. METHODS

A. Encoding

Figure 10:
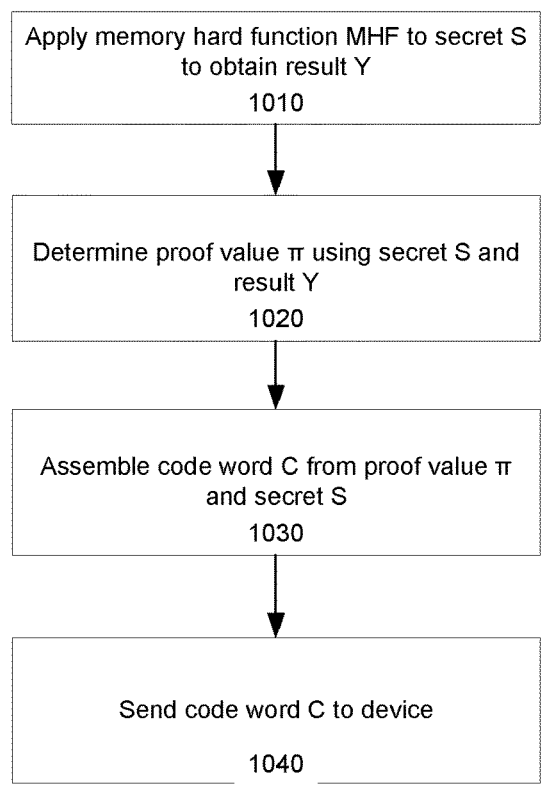
FIG. 10 is a flowchart illustrating a method for encoding a secret according to embodiments.

FIG. 10 shows a method 1000 of encoding a codeword according to embodiments. The encoding process can be performed by an encoding computer. The encoding computer may also be a provisioning computer. The encoding computer may have unbounded space.

At block 1010, a memory hard function MHF may be applied to a secret S. Secret S may be a private key for an encryption scheme. The memory hard function MHF may be an encoding function for a proof-extractable proof of space. In some embodiments, the memory hard function MI-IF may be a graph labeling or graph pebbling function of challenge-hard graphs. Applying the memory hard function MHF to the secret S generates a result Y. In some embodiments, the encoding device may compute a function of the result Y, such as a hash function. Computing the function Y may use N bytes of memory. Prior to computing the result Y, public parameters pp may be retrieved. The encoding computer may then use the public parameters pp to compute the result Y.

At block 1020, a proof function may be used to determine a proof value π based on the secret S and the result Y. In some embodiments, the proof value π may be determined with a function of the result Y.

At block 1030, a codeword C can be assembled from the proof value π and the secret S. For example, the proof value π and the secret S may be concatenated to form the codeword C.

At block 1040, the codeword C may be sent to a decoding device. The encoding device may also send the result Y. The encoding device may also send the public parameters pp.

The encoding scheme of Sebastian Faust et al. (Faust et al., 2017a) can now be described. Let $(\text{Setup } \mathcal{H}, \text{P } \mathcal{H}, \text{V } \mathcal{H})$ be a $(k, n, s_P, s_V)$-NIPoS in the ROM where $\mathcal{H}: \{0,1\}^* \to \{0, 1\}^n \mathcal{H}$ denotes the random oracle for some $n \mathcal{H} \in \text{poly}(\lambda)$. We define a (k,n)-coding scheme $\Pi = (\text{Init } \mathcal{H}, \text{Encode } \mathcal{H}, \text{Decode } \mathcal{H})$ as follows.

For the initialization, given as input a security parameter $\lambda$, Init $\mathcal{H}$ generates the public parameters for the NIPoS as $pp_{pos} \leftarrow \$ \text{ Setup } \mathcal{H}(1^\lambda)$, and outputs $pp := pp_{pos}$.

For the encoding, given as input the public parameters $pp = pp_{pos}$ and a message $x \in \{0,1\}^k$, Encode $\mathcal{H}$ runs the NIPoS prover to generate a proof of space $\pi \leftarrow P_{pp_{pos}} \mathcal{H}(x)$ using the message x as identity. Then it outputs c:= $(x,\pi) \in \{0,1\}^n$ as a codeword.

For the decoding, given a codeword c, Decode $\mathcal{H}$ first parses c as $(x,\pi)$. Then it runs the NIPoS verifier b:= $V_{pp_{pos}} \mathcal{H}(x,\pi)$. If b=1 it outputs x, otherwise it outputs $\perp$.

The above construction is a continuous non-malleable code for any $\theta \in \text{poly}(\lambda)$.

B. Decoding

Figure 11:
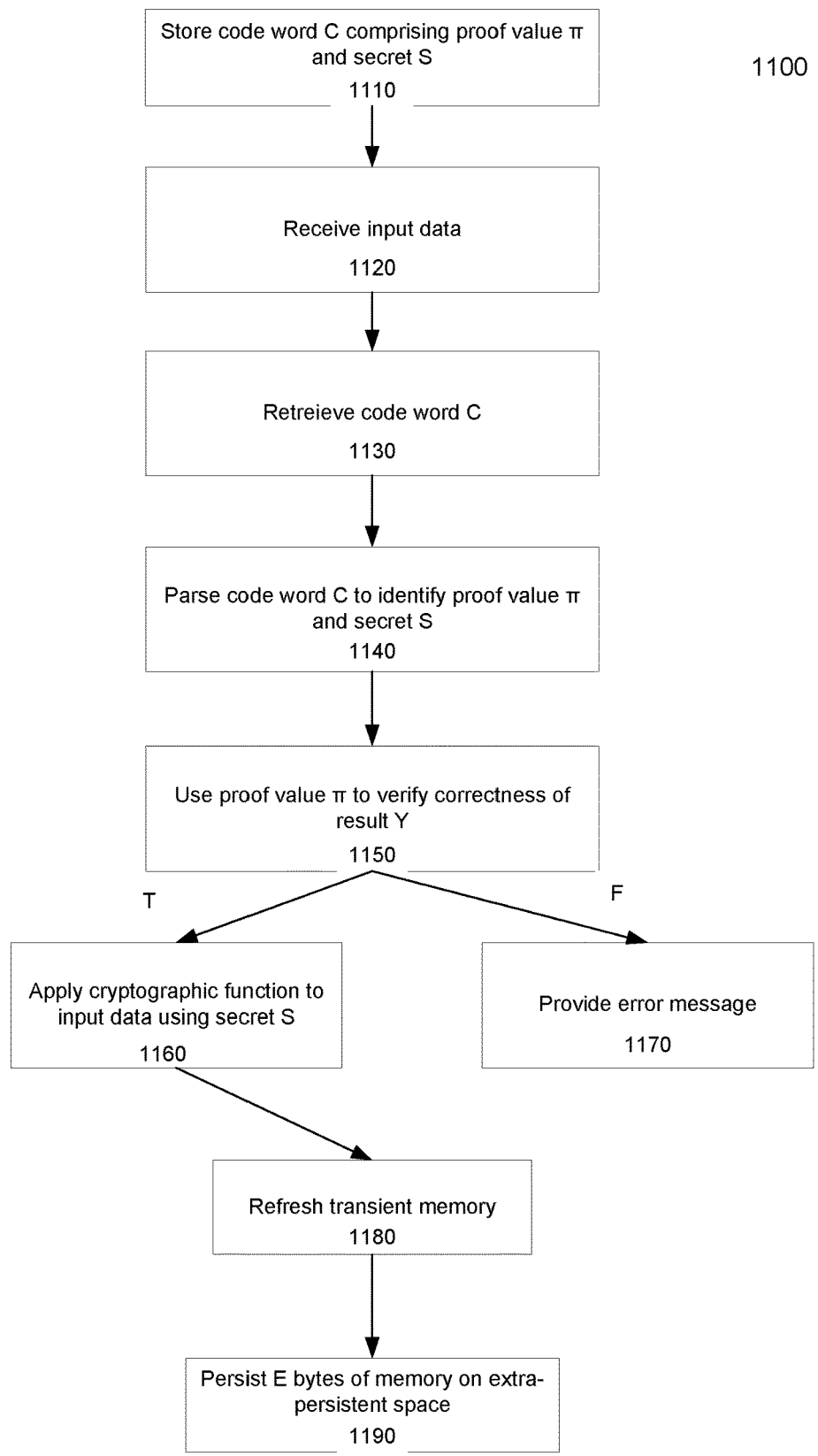
FIG. 11 is a flowchart illustrating a method for decoding a secret according to embodiments.

FIG. 11 shows a method 1100 illustrating a decoding process using a codeword for use in a cryptographic function according to embodiments of the present invention. Method 1100 may be performed by a mobile device or other verification device, particularly a device that is memory-limited. For instance, a secure element of the device may be memory limited.

At block 1110, a codeword C may be received from an encoding computer. The codeword C may comprise a proof value $\pi$ and a secret S. The secret S may be a cryptographic key, such as a private key. In some embodiments, the codeword C may also comprise a result Y obtained by applying a memory-hard function MHF to the secret S. The application of the memory-hard function MHF to the secret S or a function of the secret S can require at least N bytes of memory. The decoding device may also receive public parameters pp. The decoding device may then store the codeword C in a secure memory of a secure element. The codeword C may be stored in a persistent memory of the decoding device.

At block 1120, input data may be received. The input data may be received at the secure element. As an example, the input data can include a message that is to be encrypted before sending to a recipient.

At block 1130, the codeword C may be retrieved from the secure memory. In some embodiments, the decoding device may also retrieve the result Y.

At block 1140, the codeword C may be parsed to identify the proof value $\pi$ and the secret S. Additionally, one or more public parameters used by a memory-hard function MHF to obtain the result Y may be retrieved.

At block 1150, the proof value $\pi$ may be used to verify the correctness of the result Y as being obtained by applying the memory-hard function MHF on the secret S. The decoding may be done in a small space. The decoding can be operable to use K bytes of memory. K may be at least 100 times less than N.

At block 1160, when the correctness is true (T), a cryptographic function can be applied to the input data using the secret S. Output data from the cryptographic function may then be output from the secure element. For example, the decoding device may sign the input data. The cryptographic function may be a hash function.

At block 1170, when the correctness is false (F), an error message can be provided, e.g., a value of $\perp$ may be output. The secure element may also self-destruct when the correctness is false. For example, the secure element may flip a control bit from 0 to 1 when the correctness is false and tampering is detected. The secure element may become inoperable when the control bit is set to 1, preventing the secure element from performing further decoding or cryptographic functions.

At block 1180, the transient memory can be refreshed. The information in the transient memory may be deleted.

At block 1190, E bytes of memory may be persisted on the extra-persistent space. The memory persisted on the extra-persistent space may the information about the decoding.

C. Comparison of Constructions

Embodiments may include four constructions of space-bounded (leaky) non-malleable codes that support unbounded tampering. All of them are based on NIPoS. Two require proof-extractability whereas the other two are based on standard extractability. In this section we provide asymptotic bounds for parameters of each construction. Additionally, we compare all constructions with respect to concrete values. Let us begin by summarizing all our constructions briefly:

Construction-1 (based on SoLEG-extension): This encoding scheme is constructed from poof-extractable NIPoS. The proof-extractable NIPoS is instantiated with the challenge-hard graph built in this paper via SoLEG-extension.

Construction-2 (based on PTC's graph): This encoding scheme is also constructed from poof-extractable NIPoS. The proof-extractable NIPoS is instantiated with the PTC's challenge-hard graph proposed in Wolfgang J Paul et al. (Paul et al., 1976).

Construction-3 (based on NIPoS of Faust et al. (Faut et al., 2017a)): This encoding scheme is constructed from an extractable NIPoS. The underlying NIPoS is an instantiation is from Faust et al. (Faust et al., 2017a), which is in turn a variant of Ling Ren and Srinivas Devadas's (Ren and Devadas, 2016) proof-of-space construction. The parameters of the NIPoS can be found in Faust et al. (Faust et al., 2017b)

Construction-4 (based on MHF): This encoding scheme is again constructed from an extractable NIPoS with partial uniqueness. The underlying NIPoS is instantiated by a (heuristic) memory-hard function and a verifiable computation scheme. Corollary 6 summarizes the parameters of this NIPoS construction.

Since our constructions are obtained from different techniques and achieve different bounds, it is important to fix a common measure with respect to which a comparison makes sense. We choose to fix a standard security measure. Other parameters (namely, k,n,l,s,f,p,d) may be chosen to get 80-bit security. The number of tampering queries may also be determined as $\theta=2^{16}$. This value may be set much higher without affecting the main parameters significantly. Whenever there is a term that depends on the number of RO queries made by a poly-time adversary, we set that to $2^{64}$. Some embodiments may use an assumption that a poly-time adversary runs for $2^{80}$ time steps. Since in our setting l may be as big as p-n we compare the parameters considering p≈n to have minimal leakage. In some embodiments small values for k (close to 1) can be considered, although for most constructions much higher k is supported.

Using concrete instantiations of PExt-NIPoS (resp. Ext-NIPoS), the following concrete parameters for the resulting CSNMCs may be determined. In this table, k may be the size of the message, n may be the size of the proof, p may be the size of the persistent space, may be the size of the leakage, d may be the size of the size of the decoding function, s may be space available for executing functions, and f may be the size of the description. In embodiments, the size of the extra persistent space may be 64 bits.

| Technique | NIPoS-type | k | n, (≈ p) | l | d | s(+f) |
|---|---|---|---|---|---|---|
| *CHG | SoLEG-based | 1 MB | 801 MB | 0.8 MB | 801 MB | 1.1 GB(+f) |
|  | PTC-based | 257 MB | 256 GB | 256 MB | 256 GB | 256 GB(+f) |
| *Ext | Faust et al-based | 226 TB | 415 TB | 225 TB | 452 TB | 800 TB |
|  | MHF-based | 4 KB | 677 KB | 3 KB | 740 KB | 800 TB |

Table 3: This table shows approximate concrete parameters for the setting when p≈n. Note that for PExt-NIPoS-based constructions the last column has bound on s+f, whereas for Ext-NIPoS-based constructions the bound is only on s as f can be set to arbitrary large value.

Note that in embodiments, the size of each proof may be 100 MB, or greater. The size of the persistent space may be 100 times less than the size of the proof.

VIII. DEVICES

The provisioning device and mobile device are now described.

A. Provisioning Device

Figure 12:
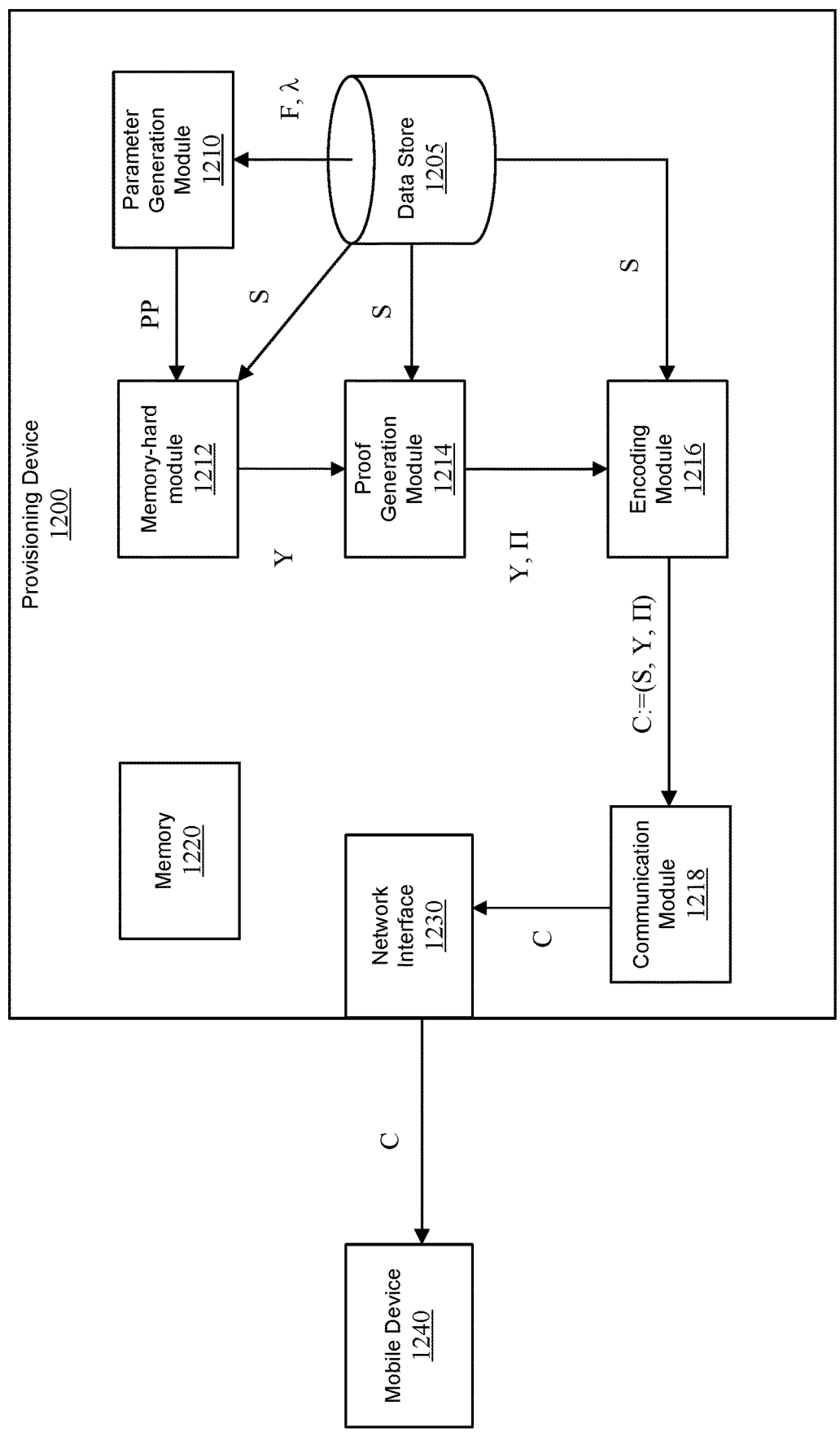
FIG. 12 shows a block diagram of a provisioning device according to embodiments.

FIG. 12 shows a block diagram of a provisioning device 1200 according to embodiments. Modules of provisioning device 1200 can be implemented in hardware or software, e.g., stored in a computer readable medium and executed by a processor. Provisioning device 1200 includes a data store 1205, a parameter generation module 1210, a memory-hard module 1212, a proof generation module 1214, an encoding module 1216, a communication module 1218, and a network interface 1230. Provisioning device 1200 may implement method 1000.

Data store 1205 can store a secret S to be encoded and a security parameter λ. The data store may be implemented in various ways, e.g., in a cache of a processor, RAM, flash memory, or a hard drive.

Parameter generation module 1210 can receive the security parameter λ and information about the function F, which includes a memory-hard function MHF) to be used (e.g., an identifier indicating which memory-hard function is used or some parameters of F). Parameter generation module 1210 can generate one or more public parameters PP based on the memory-hard function F and the security parameter λ. Other modules can also use the security parameter λ. In some embodiments, aspects of the function F can be hardcoded to parameter generation module 1210, and thus no information may need to be sent from data 1205. The one or more public parameters PP may include key(s). Thus, parameter generation module 1210 may be a key generation module for verifiable computation. Once the one or more public parameters pp are generated, they can be stored for access by other modules, as well as other devices, e.g., for public access.

Memory-hard module 1212 can implement a memory-hard function F that requires memory 1220 to be of sufficient size. Data store 1205 can be part of memory 1220, and thus can be a same memory structure. Memory-hard module 1212 can receive the one or more public parameters PP and secret S and provide a result Y, which can be used to generate a proof. Memory-hard module can include other functions than the memory-hard function F, e.g., an initial hashing function, as described herein.

Proof generation module 1214 can receive the secret S and the result Y, where Y results from operation of memory-hard module on secret S. Proof generation module 1214 provides a proof π that can be used to efficiently verify that Y is indeed the result from applying the memory-hard function F to secret S. A corresponding decoding function can use perform such a verification.

Encoding module 1216 can receive the proof π, and result Y, and the secret S for forming a code C. The code C can be provided to communications module 1218 that may put the code C into a message (e.g., an encrypted message) that is sent to mobile device 1240 by network interface 1230. Communications module 1218 can use any suitable network protocols, e.g., TCP/IP or Ethernet, as may occur for a wired connection. Once provisioned, mobile device 1240 can store code C in a secure element and decode C to implement cryptographic functionality. The decoding function that uses the proof π can be sufficiently succinct such that the decoding can be performed on a mobile device, e.g., in a secure element that may only have 1 kB, 50 kB, 100 kB, 500 kB, or 1 MB of memory.

B. Mobile Device

Figure 13:
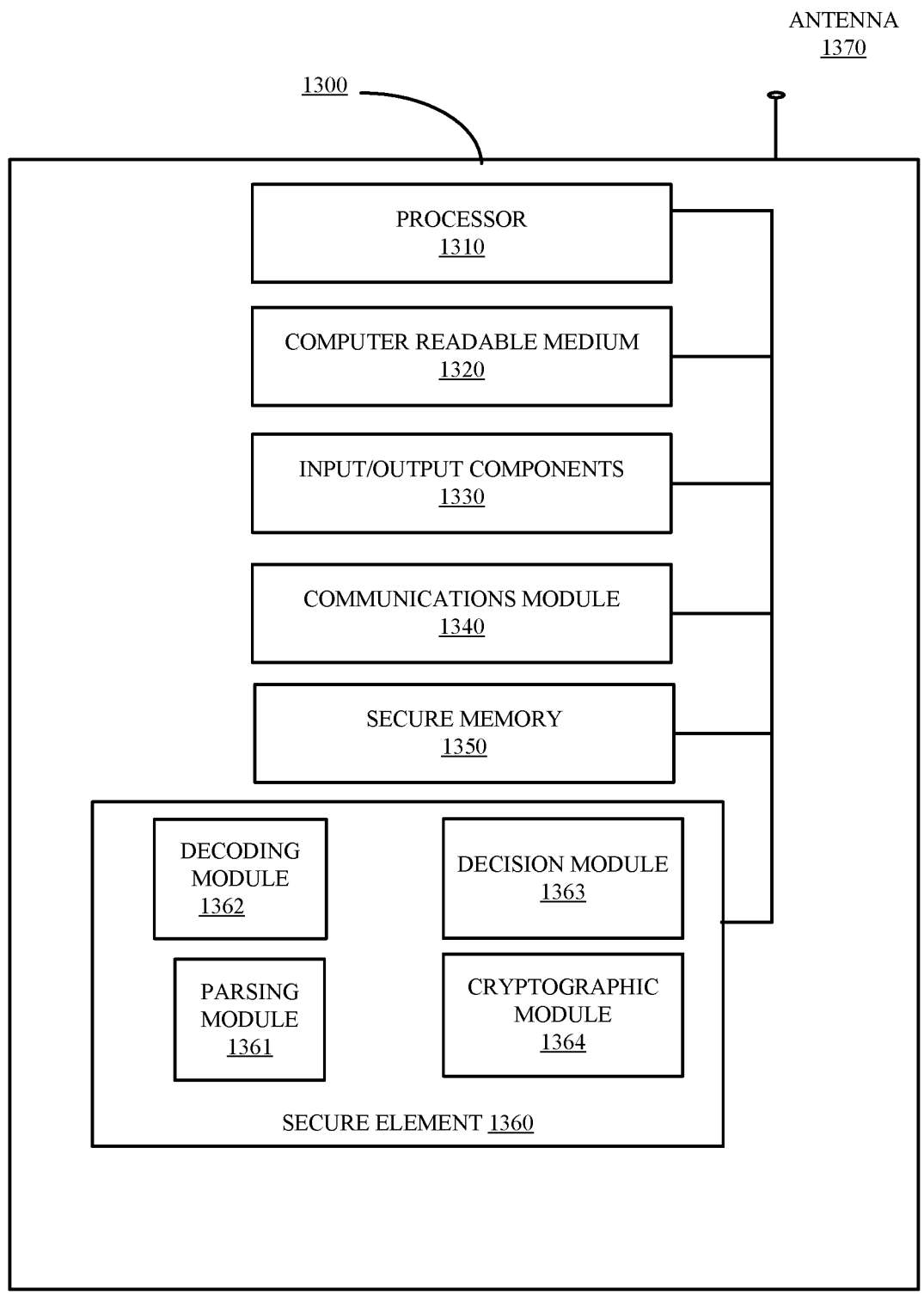
FIG. 13 shows a block diagram of a mobile device according to embodiments.

FIG. 13 shows a block diagram of a mobile device 1300 according to embodiments. Mobile device 1300 can send a request for an encoded secret, e.g., as code C. A provisioning computer can send a response with code C to mobile device 1300, which can store code C in secure memory 1350. Mobile device 1300 is an example of a decoding computer.

Mobile device 1300 includes a processor 1310, a computer readable medium 1320 (e.g., for storing software to execute on processor 1310), input/output components 1330 (e.g., a touchscreen, microphone, and speakers), a communications module 1340, a secure memory 1350, and a secure element 1360, each of which may be connected to a communications bus for communicating to each other. In some implementations, secure element 1360 may include secure memory 1350.

Communications module 1340 can receive a codeword C via antenna 1370. Secure memory 1350 can store the codeword C comprising a proof value π, a secret S, a result Y obtained by applying a memory-hard function F to the secret S, and one or more public parameters used by a memory-hard function F to obtain the result Y. The memory-hard function F may be implemented by a provisioning computer, where the application of the memory-hard function F to the secret S can require at least N bytes of memory. As an example, N may be at least one gigabyte.

As shown, secure element 1360 includes a parsing module 1361, a decoding module 1362, a decision module 1363, and a cryptographic module 1364. Secure element 1360 can receive input data on which to perform a cryptographic function. Parsing module 1361 can retrieve the codeword C from secure memory 1350, and parse the codeword C to identify the proof value π, the secret S, the result Y, and one or more public parameters.

Decoding module 1362 can decode the codeword C by using the proof value π to verify a correctness of the stored result Y as being obtained by applying the memory-hard function F on the secret S. Decoding module 1362 can be operable to use K bytes of memory. As an example, K may be at least 100 times less than N. Decoding module 1362 can output whether the correctness is verified (true) or not (false).

Decision module 1363 can use the output from decoding module 1362 to determine whether to output an error message or to engage cryptographic module 1364. When the correctness is true, cryptographic module 1364 can be applied to the input data using the secret S to obtain output data that is output from the secure element. When the correctness is false, an error message can be output from secure element 1360. Additionally, a self-destruct mechanism may be implemented to render the decoding module 1362 inoperable.

IX. EXAMPLE COMPUTER SYSTEM

Figure 14:
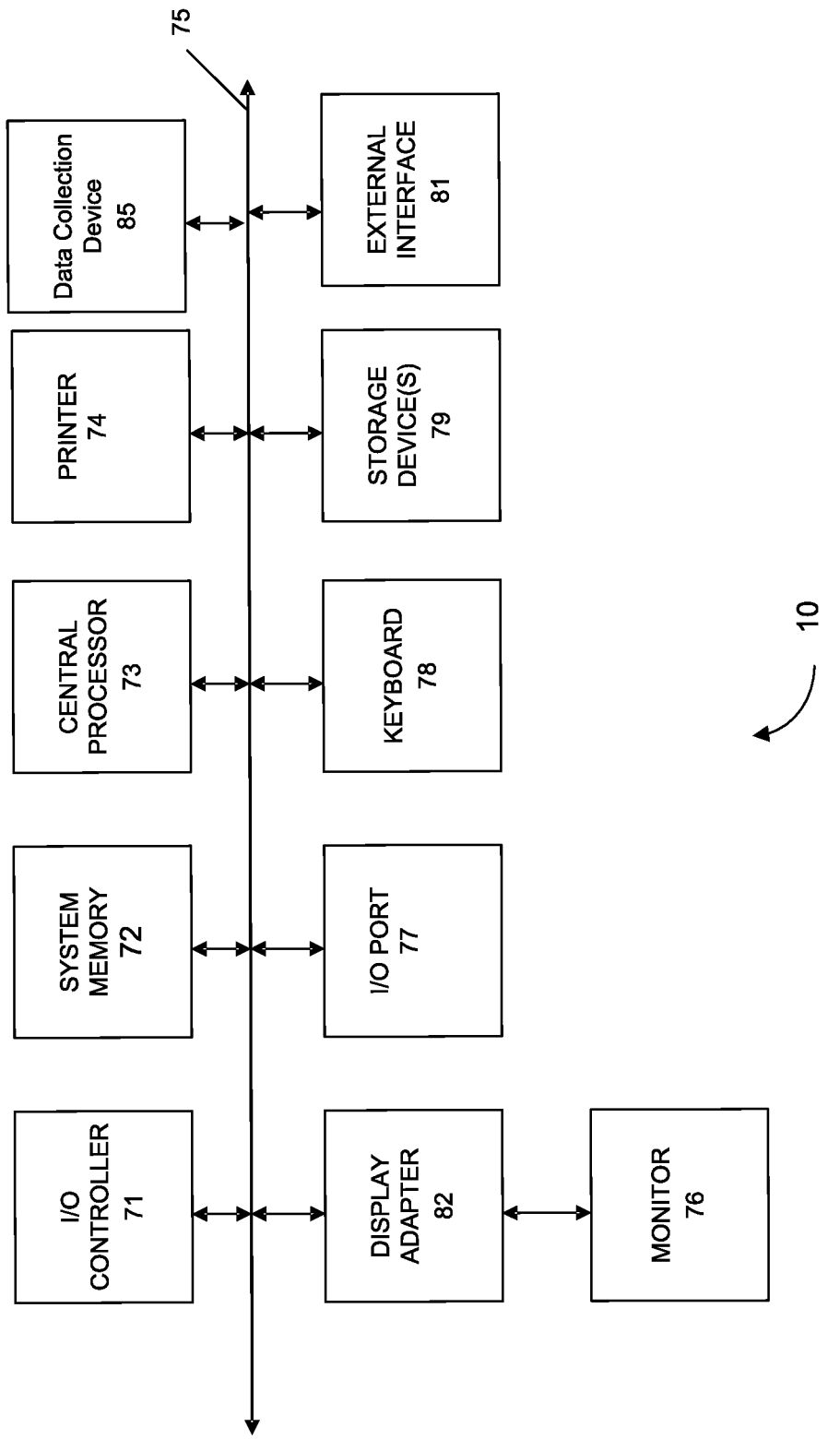
FIG. 14 shows a block diagram of an example computer system usable with systems and methods according to embodiments.

Any of the computer systems mentioned herein may utilize any suitable number of subsystems. Examples of such subsystems are shown in FIG. 14 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 14 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

X. REFERENCES

Divesh Aggarwal, Shashank Agrawal, Divya Gupta, Hemanta K. Maji, Omkant Pandey, and Manoj Prabhakaran. Optimal computational split-state non-malleable codes. pages 393-417, 2016.

Divesh Aggarwal, Yevgeniy Dodis, and Shachar Lovett. Non-malleable codes from additive combinatorics. pages 774-783, 2014.

Divesh Aggarwal, Nico Dottling, Jesper Buus Nielsen, Maciej Obremski, and Erick Purwanto. Continuous non-malleable codes in the 8-split-state model. Cryptology ePrint Archive, Report 2017/357, 2017. https://eprinti-acr.org/2017/357.

Divesh Aggarwal, Tomasz Kazana, and Maciej Obremski. Inception makes nonmalleable codes stronger. pages 319-343, 2017.

Shashank Agrawal, Divya Gupta, Hemanta K. Maji, Omkant Pandey, and Manoj Prabhakaran. Explicit non-malleable codes against bit-wise tampering and permutations. pages 538-557, 2015.

Joël Alwen, Binyi Chen, Chethan Kamath, Vladimir Kolmogorov, Krzysztof Pietrzak, and Stefano Tessaro. On the complexity of scrypt and proofs of space in the parallel random oracle model. pages 358-387, 2016.

Joël Alwen, Binyi Chen, Krzysztof Pietrzak, Leonid Reyzin, and Stefano Tessaro. Scrypt is maximally memory-hard. pages 33-62, 2017.

Joël Alwen and Vladimir Serbinenko. High parallel complexity graphs and memoryhard functions. pages 595-603, 2015.

Giuseppe Ateniese, Ilario Bonacina, Antonio Faonio, and Nicola Galesi. Proofs of space: When space is of the essence. pages 538-557, 2014.

Marshall Ball, Dana Dachman-Soled, Mukul Kulkarni, and Tal Malkin. Nonmalleable codes for bounded depth, bounded fan-in circuits. pages 881-908, 2016.

Marshall Ball, Dana Dachman-Soled, Mukul Kulkarni, and Tal Malkin. Nonmalleable codes from average-case hardness: $AC0$, decision trees, and streaming space-bounded tampering. pages 618-650, 2018.

Rishiraj Bhattacharyya and Pratyay Mukherjee. Non-adaptive programmability of random oracle. Theor. Comput. Sci., 592:97-114, 2015.

Dan Boneh, Henry Corrigan-Gibbs, and Stuart Schechter. Balloon hashing: A memory-hard function providing provable protection against sequential attacks. Cryptology ePrint Archive, Report 2016/027, 2016. http://eprint.iacr.org/2016/027.

Dan Boneh, Richard A. DeMillo, and Richard J. Lipton. On the importance of eliminating errors in cryptographic computations. J. Cryptology, 14(2):101-119, 2001.

Dan Boneh and Matthew K. Franklin. Identity-based encryption from the weil pairing. In Proceedings of the 21st Annual International Cryptology Conference on Advances in Cryptology, CRYPTO '01, pages 213-229, London, UK, UK, 2001. Springer-Verlag.

Nishanth Chandran, Vipul Goyal, Pratyay Mukherjee, Omkant Pandey, and Jalaj Upadhyay. Block-wise non-malleable codes. pages 31:1-31:14, 2016a.

Melissa Chase, Chaya Ganesh, and Payman Mohassel. Efficient zero-knowledge proof of algebraic and non-algebraic statements with applications to privacy preserving credentials. pages 499-530, 2016b.

Mandi Cheraghchi and Venkatesan Guruswami. Non-malleable coding against bitwise and split-state tampering. pages 440-464, 2014.

Dana Dachman-Soled, Feng-Hao Liu, Elaine Shi, and Hong-Sheng Zhou. Locally decodable and updatable non-malleable codes and their applications. pages 427-450, 2015.

Antoine Delignat-Lavaud, Cedric Fournet, Markulf Kohlweiss, and Bryan Parno. Cinderella: Turning shabby X.509 certificates into elegant anonymous credentials with the magic of verifiable computation. pages 235-254, 2016.

Cynthia Dwork, Moni Naor, and Hoeteck Wee. Pebbling and proofs of work. Pages 37-54, 2005.

Stefan Dziembowski, Sebastian Faust, Vladimir Kolmogorov, and Krzysztof Pietrzak. Proofs of space. pages 585-605, 2015.

Stefan Dziembowski, Tomasz Kazana, and Daniel Wichs. Key-evolution schemes resilient to space-bounded leakage. pages 335-353, 2011a.

Stefan Dziembowski, Tomasz Kazana, and Daniel Wichs. One-time computable self-erasing functions. pages 125-143, 2011b.

Stefan Dziembowski, Krzysztof Pietrzak, and Daniel Wichs. Non-malleable codes. pages 434-452, 2010.

Antonio Faonio, Jesper Buus Nielsen, Mark Simkin, and Daniele Venturi. Continuously non-malleable codes with split-state refresh. pages 121-139, 2018.

Sebastian Faust, Kristina Hostakova, Pratyay Mukherjee, and Daniele Venturi. Non-malleable codes for space-bounded tampering. pages 95-126, 2017a.

Sebastian Faust, Kristina Hostakova, Pratyay Mukherjee, and Daniele Venturi. Non-malleable codes for space-bounded tampering. Cryptology ePrint Archive, Report 2017/530, 2017b. http://eprint.iacr.org/2017/530.

Sebastian Faust, Pratyay Mukherjee, Jesper Buus Nielsen, and Daniele Venturi. Continuous non-malleable codes. pages 465-488, 2014.

Sebastian Faust, Pratyay Mukherjee, Jesper Buus Nielsen, and Daniele Venturi. A tamper and leakage resilient von neumann architecture. pages 579-603, 2015.

Sebastian Faust, Pratyay Mukherjee, Daniele Venturi, and Daniel Wichs. Efficient non-malleable codes and key-derivation for poly-size tampering circuits. pages 111-128, 2014.

Amos Fiat and Adi Shamir. How to prove yourself: Practical solutions to identification and signature problems. pages 186-194, 1987. Marc Fischlin, Anja Lehmann, Thomas Ristenpart, Thomas Shrimpton, Martijn Stam, and Stefano Tessaro. Random oracles with(out) programmability. Pages 303-320, 2010.

Vipul Goyal, Omkant Pandey, and Silas Richelson. Textbook non-malleable commitments. pages 1128-1141, 2016.

Aurore Guillevic and Francois Morain. Discrete logarithms. Book Chapter 9. https://hal.inria.fr/hal-01420485v1/document.

Zahra Jafargholi and Daniel Wichs. Tamper detection and continuous nonmalleable codes. pages 451-480, 2015.

Bhavana Kanukurthi, Sai Lakshmi Bhavana Obbattu, and Sruthi Sekar. Four-state non-malleable codes with explicit constant rate. pages 344-375, 2017.

Bhavana Kanukurthi, Sai Lakshmi Bhavana Obbattu, and Sruthi Sekar. Nonmalleable randomness encoders and their applications. pages 589-617, 2018.

Feng-Hao Liu and Anna Lysyanskaya. Tamper and leakage resilience in the splitstate model. pages 517-532, 2012.

Mohammad Mahmoody, Tal Moran, and Salil P. Vadhan. Publicly verifiable proofs of sequential work. pages 373-388, 2013.

Ralph C. Merkle. A digital signature based on a conventional encryption function. pages 369-378, 1988.

Victor Miller. Short programs for functions on curves. Unpublished manuscript, 1986.

Rafail Ostrovsky, Giuseppe Persiano, Daniele Venturi, and Ivan Visconti. Continuously non-malleable codes in the split-state model from minimal assumptions. pages 608-639, 2018.

Bryan Parno, Jon Howell, Craig Gentry, and Mariana Raykova. Pinocchio: Nearly practical verifiable computation. pages 238-252, 2013.

Krzysztof Pietrzak. Proofs of catalytic space. IACR Cryptology ePrint Archive, 2018:194, 2018.

Wolfgang J Paul, Robert Endre Tarjan, and James R Celoni. Space bounds for a game on graphs. Mathematical systems theory, 10(1):239-251, 1976.

Ling Ren and Srinivas Devadas. Proof of space from stacked expanders. Pages 262-285, 2016.

What is claimed is:

1. A method for decoding a secret, the method comprising performing on a decoding computer:
storing a codeword C comprising a proof value $\pi$ and a secret S in a persistent memory of the decoding computer, the persistent memory comprising P bytes of memory, wherein the codeword C uses c bytes, wherein the proof value $\pi$ is determined using the secret S and a result Y, the result Y obtained by applying a memory-hard function MHF to the secret S or to a function of the secret S, wherein the proof value $\pi$ is proof-extractable, wherein the applying of the memory-hard function MHF to the secret S requires at least N bytes of memory, and wherein more than one proof value is combinable with secret S to provide a valid codeword, and wherein P-c memory forms extra-persistent space;
receiving input data;
retrieving the codeword C from the persistent memory;
parsing the codeword C to identify the proof value $\pi$ and the secret S;
performing, using a transient memory of the decoding computer, a decoding of the codeword C by:
using the proof value $\pi$ to verify a correctness of the result Y as being obtained from the memory-hard function MHF using the secret S, wherein a decoding function is operable to use K bytes of memory, K being less than N;
when the correctness is true, applying a cryptographic function to the input data using the secret S to obtain output data; and
when the correctness is false, providing an error message and causing the decoding computer to be inoperable to perform subsequent decoding operations;
refreshing the transient memory of the decoding computer; and
persisting E bytes of memory of the decoding on the extra-persistent space, wherein E is less than N and less than a size of the result Y.

2. The method of claim 1, further comprising performing on an encoding computer:
applying the memory-hard function MHF to the secret S or to a function of the secret S to obtain the result Y, wherein the applying of the memory-hard function MHF to the secret S requires at least N bytes of memory on the encoding computer;
determining, using a proof function, a proof value $\pi$ using the secret S and the result Y;
assembling the codeword C from the proof value $\pi$ and the secret S; and
sending the codeword C to a device that is configured to store the codeword C in the persistent memory of the device and later decode the codeword C, wherein the proof value $\pi$ is configured to be used by the decoding function of the device to verify the correctness of the result Y as being obtained from the memory-hard function MHF using the secret.

3. The method of claim 1, wherein E is 100 times smaller than the proof value $\pi$.

4. The method of claim 1, wherein the size of the proof value $\pi$ is smaller than P.

5. The method of claim 1, wherein the memory-hard function MHF is a graph labeling function applied to a graph comprising a plurality of nodes, the result Y is a hash of a graph labeling, and the proof value $\pi$ comprises a subset of the graph labeling.

6. The method of claim 5, wherein verifying the correctness of the result Y further comprises:
randomly selecting nodes from the graph;
computing a partial labeling of the graph using the selected nodes; and
comparing the partial labeling of the graph to the proof value $\pi$.

7. The method of claim 5, wherein the graph is a challenge-hard graph comprising a plurality of challenge nodes, wherein determining a graph labeling for the plurality of challenge nodes requires at least N bytes of memory and wherein determining a graph labeling for the plurality of challenge nodes occurs with exponential time.

8. The method of claim 7, wherein the proof value $\pi$ is determined with the entire result Y.

9. The method of claim 1, wherein the proof value $\pi$ is at least 100 MB.

10. The method of claim 1, wherein the codeword C is stored in secure memory, and wherein a secure element performs the decoding of the codeword C and the applying of the cryptographic function.

11. A computer product comprising a non-transitory computer-readable medium storing a plurality of instructions for controlling a decoder computer to perform a method comprising:
storing a codeword C comprising a proof value $\pi$ and a secret S in a persistent memory of the decoding computer, the persistent memory comprising P bytes of memory, wherein the codeword C uses c bytes, wherein the proof value $\pi$ is determined using the secret S and a result Y, the result Y obtained by applying a memory-hard function MHF to the secret S or to a function of the secret S, wherein the proof value $\pi$ is proof-extractable, wherein the applying of the memory-hard function MHF to the secret S requires at least N bytes of memory, and wherein more than one proof value is combinable with secret S to provide a valid codeword, and wherein P-c memory forms extra-persistent space;
receiving input data;
retrieving the codeword C from the persistent memory;
parsing the codeword C to identify the proof value $\pi$ and the secret S;

performing, using a transient memory of the decoding computer, a decoding of the codeword C by:
  using the proof value π to verify a correctness of the result Y as being obtained from memory-hard function MHF using the secret S, wherein a decoding function is operable to use K bytes of memory, K being less than N;
  when the correctness is true, applying a cryptographic function to the input data using the secret S to obtain output data; and
  when the correctness is false, providing an error message and causing the decoding computer to be inoperable to perform subsequent decoding operations;
refreshing the transient memory of the decoding computer; and
persisting E bytes of memory of the decoding on the extra-persistent space, wherein E is less than N and less than a size of the result Y.

12. A device comprising:
a secure memory storing a codeword C comprising a proof value π and a secret S in a persistent memory, the persistent memory comprising P bytes of memory, wherein the codeword C uses c bytes, wherein the proof value π is determined using the secret S and a result Y, the result Y obtained by applying a memory-hard function MHF to the secret S or to a function of the secret S, wherein the proof value π is proof-extractable, wherein the applying of the memory-hard function MHF to the secret S requires at least N bytes of memory, and wherein more than one proof value is combinable with secret S to provide a valid codeword, and wherein P-c memory forms extra-persistent space; and
a secure element configured to:
  receive input data;
  retrieve the codeword C from the persistent memory;
  parse the codeword C to identify the proof value π and the secret S;
  perform, using a transient memory of the device, a decoding of the codeword C by:
    using the proof value π to verify a correctness of the result Y as being obtained from the memory-hard function MHF using the secret S, wherein a decoding function is operable to use K bytes of memory, K being less than N;
    when the correctness is true, applying a cryptographic function to the input data using the secret S to obtain output data; and
    when the correctness is false, providing an error message and causing the device to be inoperable to perform subsequent decoding operations;
  refresh the transient memory of the device; and
  persist E bytes of memory of the decoding on the extra-persistent space, wherein E is less than N and less than a size of the result Y.

13. The device of claim 12, wherein the codeword C is assembled by an encoding computer by a method that comprises:
applying the memory-hard function MHF to the secret S or to a function of the secret S to obtain the result Y, wherein the applying of the memory-hard function MHF to the secret S requires at least N bytes of memory on the encoding computer;
determining, using a proof function, a proof value π using the secret S and the result Y;
assembling the codeword C from the proof value π and the secret S; and
sending the codeword C to a device that is configured to store the codeword C in the persistent memory of the device and later decode the codeword C, wherein the proof value π is configured to be used by the decoding function of the device to verify the correctness of the result Y as being obtained from the memory-hard function MHF using the secret.

14. The device of claim 12, wherein E is 100 times smaller than the proof value π.

15. The device of claim 12, wherein the size of the proof value π is smaller than P.

16. The device of claim 12, wherein the memory-hard function MHF is a graph labeling function applied to a graph comprising a plurality of nodes, the result Y is a hash of a graph labeling, and the proof value π comprises a subset of the graph labeling.

17. The device of claim 16, wherein verifying the correctness of the result Y further comprises:
randomly selecting nodes from the graph;
computing a partial labeling of the graph using the selected nodes; and
comparing the partial labeling of the graph to the proof value π.

18. The device of claim 16, wherein the graph is a challenge-hard graph comprising a plurality of challenge nodes, wherein determining a graph labeling for the plurality of challenge nodes requires at least N bytes of memory and wherein determining a graph labeling for the plurality of challenge nodes occurs with exponential time.

19. The device of claim 12, wherein the proof value π is at least 100 MB.

20. The device of claim 12, wherein the codeword C is stored in secure memory, and wherein the secure element performs the decoding of the codeword C and the applying of the cryptographic function.

* * * * *